United States Patent
Paweleck et al.

(10) Patent No.: US 11,306,467 B2
(45) Date of Patent: Apr. 19, 2022

(54) APPARATUS AND METHOD FOR MOUNTING FOOD WASTE DISPOSER IN RELATION TO SINK

(71) Applicant: Emerson Electric Co., St. Louis, MO (US)

(72) Inventors: Elijah Paweleck, Milwaukee, WI (US); Timothy J. Kocha, Mt. Pleasant, WI (US); Sankalp, Kenosha, WI (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 17/040,671

(22) PCT Filed: Mar. 27, 2019

(86) PCT No.: PCT/US2019/024210
§ 371 (c)(1),
(2) Date: Sep. 23, 2020

(87) PCT Pub. No.: WO2019/191183
PCT Pub. Date: Oct. 3, 2019

(65) Prior Publication Data
US 2021/0017745 A1  Jan. 21, 2021

Related U.S. Application Data

(60) Provisional application No. 62/648,537, filed on Mar. 27, 2018.

(51) Int. Cl.
  *E03C 1/266* (2006.01)
  *F16L 37/248* (2006.01)
(52) U.S. Cl.
  CPC .......... *E03C 1/2665* (2013.01); *F16L 37/248* (2013.01)

(58) Field of Classification Search
  CPC .................................................... E03C 1/2665
  (Continued)

(56) References Cited

U.S. PATENT DOCUMENTS

| 9,139,990 B2 | 9/2015 | Bennage |
| 9,267,626 B2 | 2/2016 | Falcone et al. |
| 2008/0301871 A1 | 12/2008 | Hanson et al. |

FOREIGN PATENT DOCUMENTS

| CN | 2920403 | 7/2007 |
| CN | 204849948 | 12/2015 |

(Continued)

OTHER PUBLICATIONS

Anaheim Manufacturing, "Food Waste Disposer Owner's Guide," brochure, 560C485PO1 Rev A, 24 pages, www.anaheimmfg.com (admitted to be prior art and to have been publicly available at least as of Aug. 6, 2013).

(Continued)

*Primary Examiner* — Lori L Baker
(74) *Attorney, Agent, or Firm* — SmithAmundsen LLC

(57) ABSTRACT

Mounting systems for waste disposers such as food waste disposers, waste disposers employing such systems, and related methods, a mounting system includes a flange component having first and second ends and a tubular structure extending along a first axis between the ends. The mounting system also includes a mounting flange component having an inner edge defining at least in part an orifice extending through the mounting flange component and sized so that a first portion of the tubular structure including the second end can pass partly into or entirely through the orifice. When lugs of the mounting flange component are aligned with protrusions of the tubular structure and the tubular structure is positioned so that tips of the lugs are positioned between the protrusions and the first end, then the mounting flange (Continued)

component is secured in relation to the first flange component.

18 Claims, 14 Drawing Sheets

(58) Field of Classification Search
USPC .................................................. 4/495; 285/46
See application file for complete search history.

(56) References Cited

FOREIGN PATENT DOCUMENTS

| | | |
|---|---|---|
| CN | 204849956 | 12/2015 |
| CN | 206328825 | 7/2017 |
| DE | 4110676 | 10/1992 |
| DE | 19607986 | 9/1997 |
| EP | 2816162 | 12/2014 |
| WO | 2019191183 | 10/2019 |

OTHER PUBLICATIONS

PCT/US2019/024210 International Search Report and Written Opinion of the International Searching Authority dated Jul. 22, 2019 (14 pages).

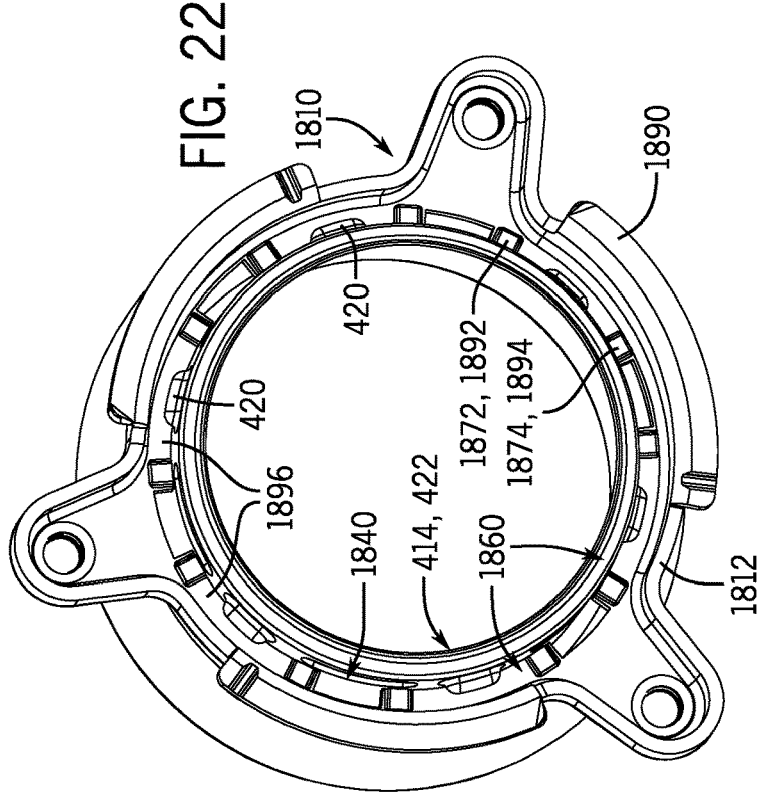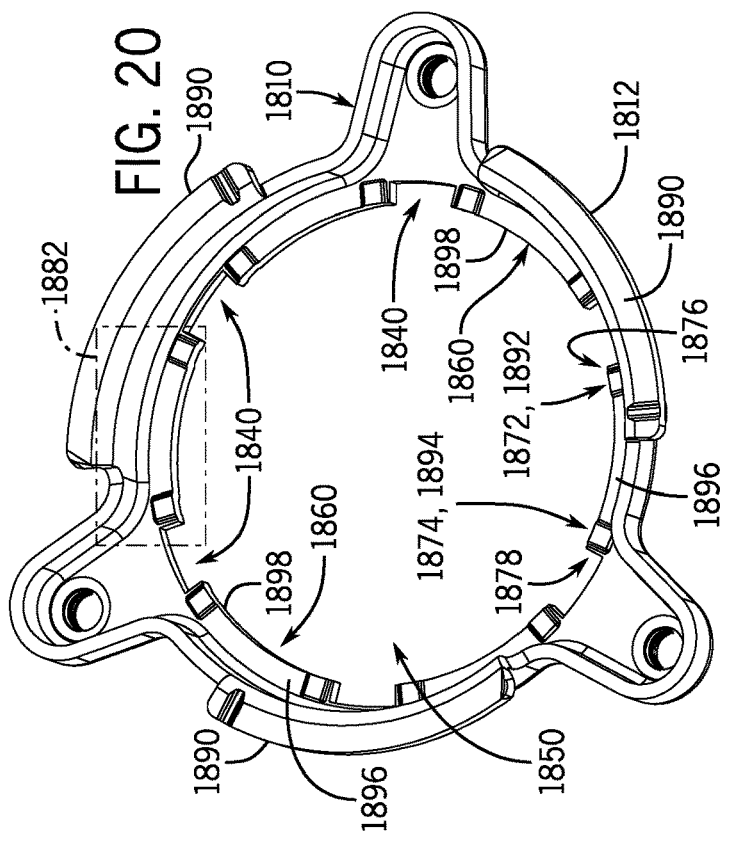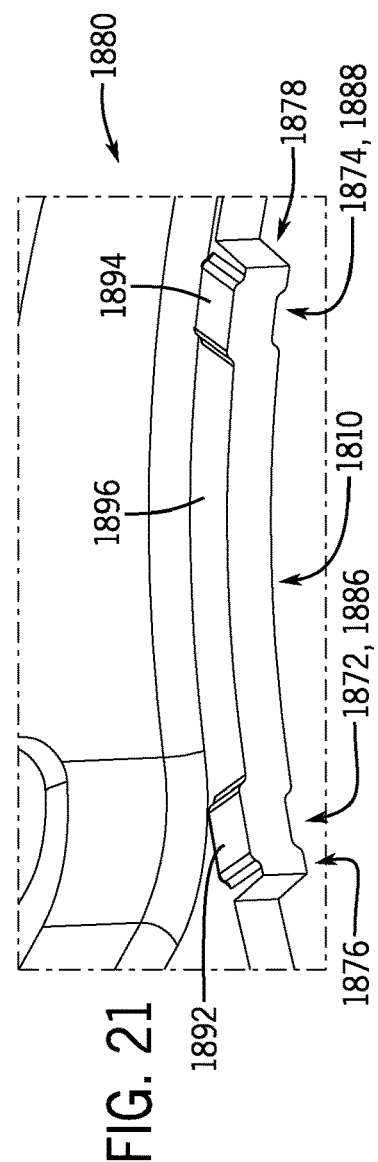

APPARATUS AND METHOD FOR MOUNTING FOOD WASTE DISPOSER IN RELATION TO SINK

FIELD

The present disclosure relates to waste disposers such as food waste disposers and methods of mounting such waste disposers in relation to other structures such as sinks and, more particularly, to waste disposer assemblies or mounting assemblies of or for such waste disposers, and methods of mounting such waste disposers in relation to other structures such as sinks, by way of such waste disposer assemblies or mounting assemblies.

BACKGROUND

Food waste disposers are used to comminute food scraps into particles small enough to pass through household drain plumbing. Referring to FIG. 1 (Prior Art), a conventional food waste disposer 10 is often mounted to a sink, such as a kitchen sink (not shown), and includes a food conveying section 12, a motor section 14, and a grinding section 16 disposed between the food conveying section and the motor section. The food conveying section 12 includes a housing 18 that forms an inlet for receiving food waste and water. The food conveying section 12 conveys the food waste to the grinding section 16, and the motor section 14 includes a motor imparting rotational movement to a motor shaft to operate the grinding section.

Conventional food waste disposers such as the food waste disposer 10 are generally installed to a sink in a two-step procedure using a mounting assembly 100, an example of which is shown in FIG. 1 in an exploded manner relative to the food waste disposer. First, a sink flange assembly 102, which includes a sink (or strainer) flange 104, a sink gasket 106, a back-up flange 108, an upper mounting flange 110, bolts 112, and a retaining ring 114 are installed or mounted in relation to the sink (which again is not shown in FIG. 1). Second, a disposer assembly 30 including the food waste disposer 10 and also including a mounting (or sealing) gasket 116 and a lower mounting flange 118 are attached to the sink flange assembly 102. The combination of the disposer assembly 30 and the mounting assembly 100 can be considered to constitute an overall food waste disposer assembly 150.

More particularly with respect to the attachment of the disposer assembly 30 to the sink flange assembly 102, it should be understood that the lower mounting flange 118 is placed around the housing 18 that forms the inlet of the food conveying section 12. The mounting gasket 116 is then placed around that inlet as well, above the lower mounting flange 118, in a manner tending to secure the mounting gasket 116 to the inlet, by virtue of a lip at the inlet of the housing 18. Attachment of the disposer assembly 30 including the food waste disposer 10 to the sink flange assembly 102 and thereby to the sink is then particularly achieved by engaging mounting tabs 120 of the lower mounting flange 118 with ramps (or inclined mounting fasteners or edges or ridges) 122 of the upper mounting flange 110 and then rotating the lower mounting flange 118 relative to the upper mounting flange 110 until secure. When the lower mounting flange 118 and upper mounting flange 110 are secured together, the mounting gasket 116 is compressed therebetween.

Although food waste disposers have for a long time been successfully installed in relation to sinks in the manner described above (or in similar manners), there remain difficulties associated with the installation process that can make the process undesirably challenging or inconvenient for some individuals who are performing that process. One difficulty experienced by some customers when installing a conventional food waste disposer in relation to a sink, and particularly when installing a sink flange assembly as part of that procedure, concerns the steps of removing a snap ring of the sink flange assembly (e.g., the retaining ring 114 of FIG. 1) and then putting that snap ring back on again (e.g., onto the bottom end of the sink flange). Indeed, snap ring removal and reinstallation can prove to be a significant annoyance for customers who do not regularly install food waste disposers.

Accordingly, it would be desirable if an improved food waste disposer assembly (or other waste disposer assembly), and/or an improved mounting assembly of or for such a food waste disposer assembly (or other waste disposer assembly), and/or an improved method of installing or mounting such a waste disposer assembly or mounting assembly in relation to another structure such as a sink, could be developed that alleviated or addressed one or more of the above-discussed concerns associated with conventional waste disposer assemblies, or alleviated or addressed one or more other concerns or disadvantages, or provided one or more advantages by comparison with conventional arrangements.

BRIEF SUMMARY

In at least some example embodiments, the present disclosure relates to a mounting system for mounting a waste disposer. The mounting system includes a first flange component having first and second ends and a tubular structure having an outer cylindrical surface, the tubular structure extending along a first axis between the first and second ends. Also, the mounting system includes a mounting flange component having an inner edge defining at least in part an orifice extending through the mounting flange component and sized so that a first portion of the tubular structure including the second end can pass partly into or entirely through the orifice where, when the first portion of the tubular structure is received in the orifice, both the orifice and the tubular structure extend along the first axis. The tubular structure includes a plurality of first protrusions extending radially outward from the outer cylindrical surface, the plurality of first protrusions including a first one of the first protrusions and one or more additional ones of the first protrusions. Also, the mounting flange component includes a plurality of lugs having respective tips proximate to or along the inner edge, the plurality of lugs including a first one of the lugs and one or more additional ones of the lugs. Additionally, the respective lugs are arranged around the orifice and the respective first protrusions are arranged around the outer cylindrical surface so that, if the first portion of the tubular structure is positioned into the orifice such that the first one of the lugs is rotationally aligned with the first one of the first protrusions about the first axis, then each of the one or more additional ones of the lugs is also rotationally aligned with a respective one of the one or more additional ones of the first protrusions about the first axis. Further, when the respective lugs are aligned with the respective first protrusions and when the tubular structure is positioned sufficiently far into the orifice along the first axis so that the respective tips of the respective lugs are positioned between the respective first protrusions and the first end of the first flange component, then the mounting flange component is secured in relation to the first flange component.

Additionally, in at least some further example embodiments, the present disclosure relates to a method of assembling a mounting system for use in coupling a food waste disposer to a sink. The method includes positioning a mounting flange component in relation to a sink flange component so that an orifice extending through, and defined at least in part by an inner edge of, the mounting flange component is proximate a first end of an outer cylindrical surface of a tubular structure of the sink flange component. The method further includes moving the mounting flange component relative to the tubular structure along a first axis along which the tubular structure extends, so that a first portion of the tubular structure including the first end can pass partly into or entirely through the orifice and the mounting flange component moves toward a second end of the outer cylindrical surface. The method also includes rotating the mounting flange component relative to the tubular structure about the first axis so that a plurality of lugs extending from, and having respective tips proximate to or along the inner edge of, the mounting flange component respectively become rotationally aligned with a plurality of first protrusions extending radially outward from the outer cylindrical surface. As a consequence of the rotating of the mounting flange component relative to the tubular structure, the respective tips of the respective lugs are positioned between the first protrusions and the second end of the sink flange component, such that the mounting flange component is secured in relation to the sink flange component.

Further, in at least some additional example embodiments, the present disclosure relates to a food waste disposer system. The food waste disposer system includes a food waste disposer, a mounting assembly configured to allow for securing of the waste disposer system to a sink, and at least one coupling component linking the waste disposer with the mounting assembly. Additionally, the mounting assembly includes a sink flange component having first and second ends and a tubular structure having an outer cylindrical surface, the tubular structure extending along a first axis between the first and second ends and including a plurality of first protrusions extending radially outward from the outer cylindrical surface. Also, the mounting assembly includes a mounting flange component having an inner edge defining at least in part an orifice extending through the mounting flange component and sized so that a first portion of the tubular structure including the second end can pass partly into or entirely through the orifice, the mounting flange component including a plurality of lugs having respective tips proximate to or along the inner edge. Further, the mounting assembly additionally includes means for allowing the first protrusions to pass in relation to the mounting flange component when the mounting flange component is rotated about the first axis relative to the tubular structure so that the first protrusions proceed from a first status in which the sink flange component with the first protrusions is axially movable relative to the mounting flange component along the first axis to a second status in which respective tips of the respective lugs are positioned between the first protrusions and the first end of the sink flange component along the first axis such that the sink flange component is no longer axially movable relative to the mounting flange component along the first axis.

BRIEF DESCRIPTION OF THE DRAWINGS

Embodiments of food waste disposer assemblies (or other waste disposer assemblies), mounting assemblies of or for such waste disposer assemblies, and related methods are disclosed with reference to the accompanying drawings and are for illustrative purposes only. The waste disposer/mounting assembly apparatuses and methods encompassed herein are not limited in their applications to the details of construction, arrangements of components, or other aspects or features illustrated in the drawings, but rather such apparatuses and methods encompassed herein include other embodiments or are capable of being practiced or carried out in other various ways. Like reference numerals are used to indicate like components. In the drawings:

FIG. 20 is a bottom perspective view of the upper mounting flange component shown in FIG. 19;

FIG. 21 is a detail view of a section of the upper mounting flange component of FIG. 20;

FIG. 22 is a bottom perspective view of a combination of the upper mounting flange component and a sink flange component of the improved mounting assembly of FIG. 18 when those two components are assembled with one another;

DETAILED DESCRIPTION

Figure 2:
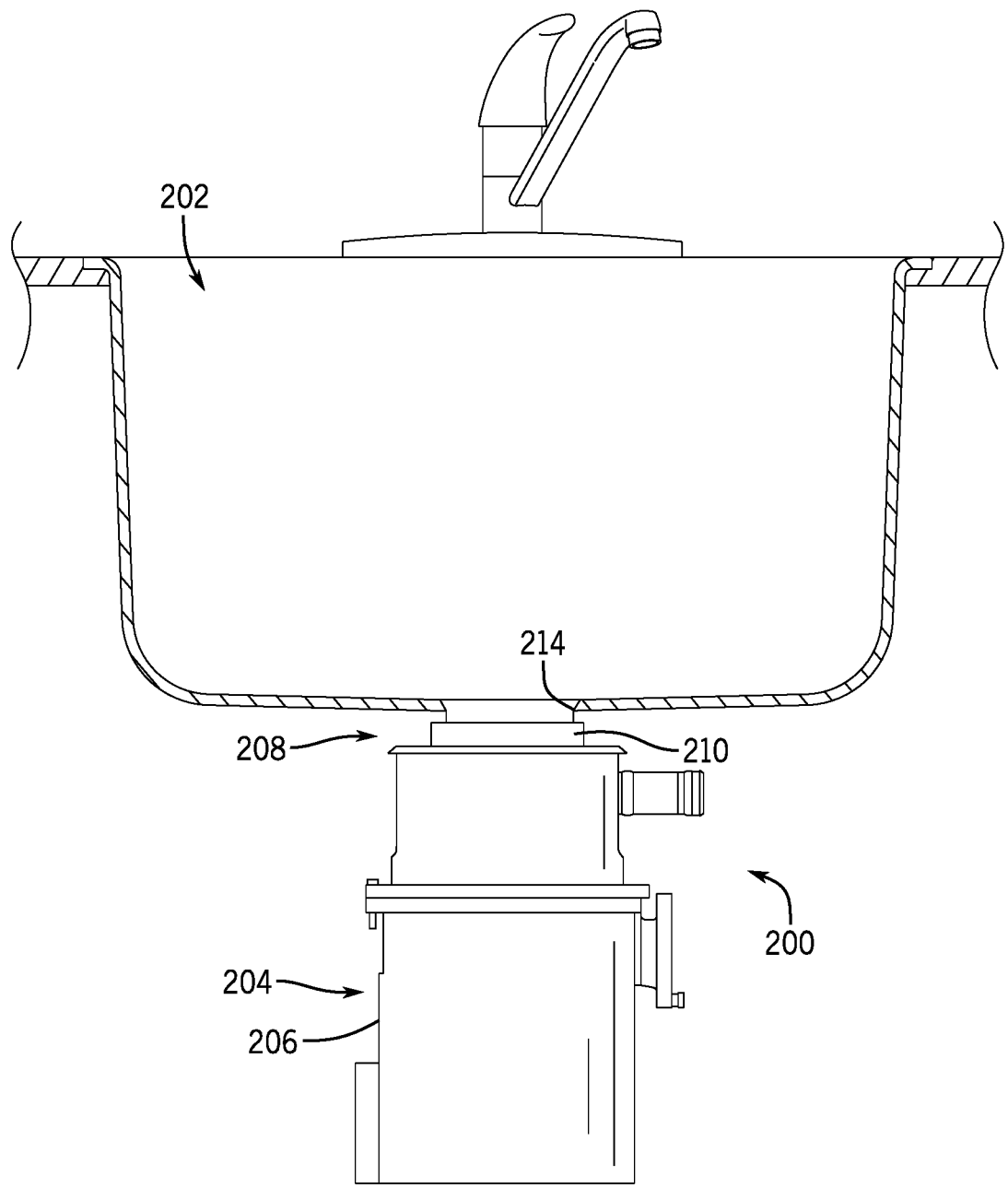
FIG. 2 is a partly cross-sectional, partly front elevation view of an example improved food waste disposer assembly having an improved mounting assembly mounted in relation to a sink, in accordance with an example embodiment encompassed herein.

Referring to FIG. 2, an improved food waste disposer assembly 200 in accordance with an example embodiment encompassed herein is installed or mounted in relation to a sink 202. Although FIG. 2 shows a side elevation view of the food waste disposer assembly 200, FIG. 2 provides a cut-away cross-sectional view of the sink 202, so as to better illustrate how the food waste disposer assembly is installed relative to the sink. The food waste disposer assembly 200 particularly includes a disposer assembly 204 that includes a food waste disposer 206 and an improved mounting assembly (or sink flange assembly) 208 that allows for the disposer assembly 204 to be attached to the sink 202. As will be described in further detail below, the improved mounting assembly 208 particularly includes an improved upper mounting flange 210 and an improved sink flange (or strainer flange) 214.

Figure 1:
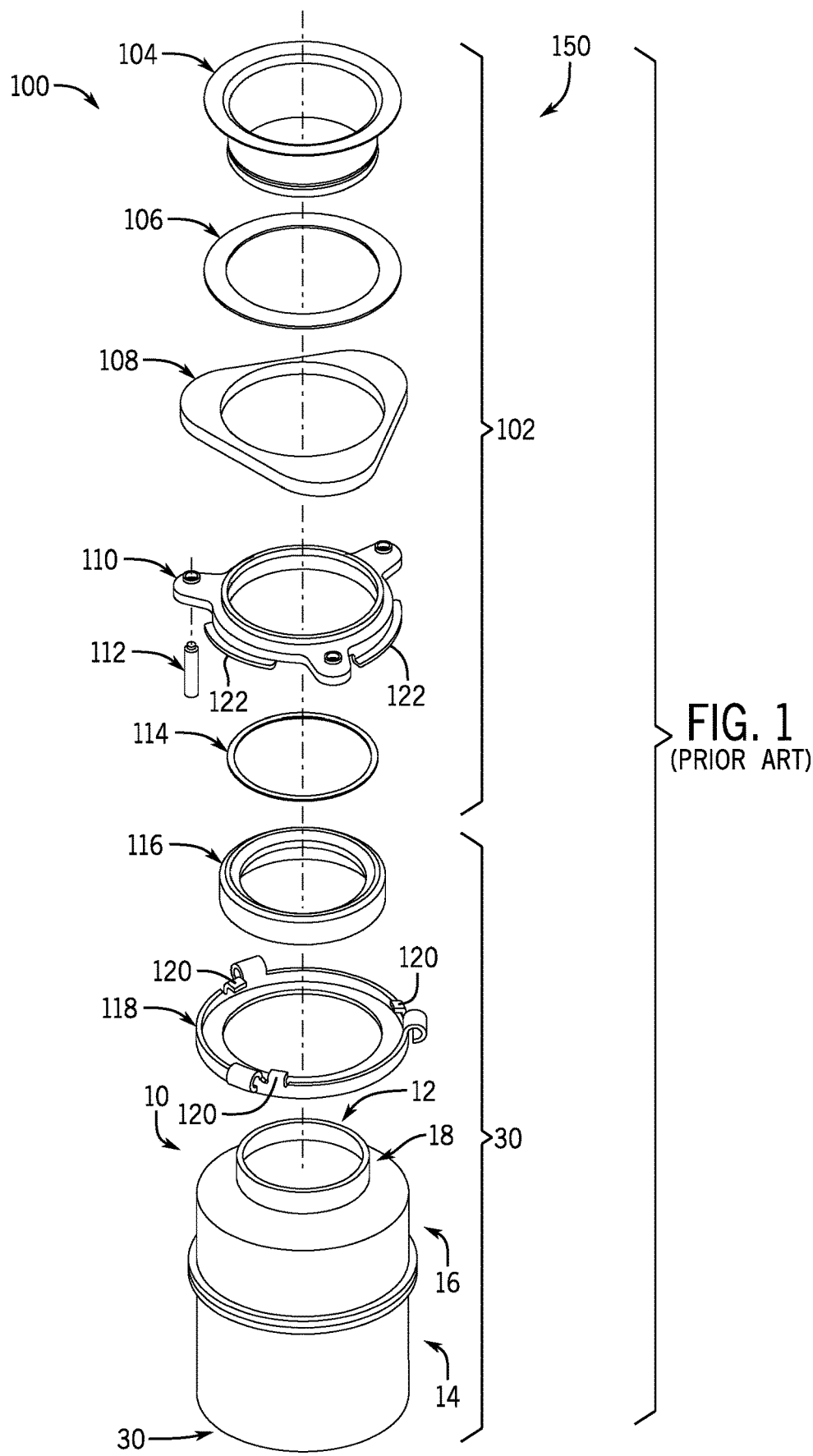
FIG. 1 is an exploded view of a Prior Art food waste disposer assembly including both a mounting assembly and a disposer assembly including a food waste disposer, as can be installed in relation to another structure such as a sink.

It should be appreciated that the food waste disposer assembly 200 in the present embodiment can be similar in many respects to the food waste disposer assembly 150 in FIG. 1. Among other things, it should be understood that the mounting assembly 208 of the food waste disposer assembly 200 can include not only the sink flange 214 and the upper mounting flange 210, but also can include components that correspond to the sink gasket 106, the back-up flange 108, and the bolts 112 of FIG. 1. It is noteworthy, however, that the mounting assembly 208 in the present embodiment does not employ or require a retaining ring or snap ring that would correspond to the retaining ring 114 of FIG. 1 (albeit, in some alternate embodiments, the mounting assembly can be used additionally in combination with a retaining ring, such as the retaining ring 114). Rather, as discussed further below, the upper mounting flange 210 in this embodiment is secured in relation to the sink flange 214 by way of a different mechanism, such that a retaining ring (or snap ring) is not required (albeit in some alternate embodiments, a retaining or snap ring can still additionally be present). Also, the disposer assembly 204, in addition to including the food waste disposer 206, can further include other components that correspond to the disposer assembly 30 of FIG. 1, including components corresponding to the mounting (or sealing) gasket 116 and lower mounting flange 118.

At the same time, in other embodiments, the mounting assembly 208 and disposer assembly 204 need not include components that respectively correspond to counterpart components of the sink flange assembly 102 and disposer assembly 30 of FIG. 1, respectively, or can include one or more additional components that are in addition to or different from the components shown in FIG. 1. Further, although the food waste disposer 206 of FIG. 2 can be the same or substantially similar to the food waste disposer 10 of FIG. 1, in alternate embodiments other types of food waste disposers can be employed. Indeed, the present disclosure is intended to encompass a wide variety of embodiments including embodiments having other types of waste disposers (including waste disposers that are suited for disposing of other materials rather than food) as well as waste disposers that are to be mounted in relation to other types of structures instead of sinks.

Notwithstanding the actual or possible similarities between the improved food waste disposer assembly 200 of FIG. 2 and the food waste disposer assembly 150 of FIG. 1, the improved food waste disposer assembly 200 and particularly the improved mounting assembly 208 thereof include features that are different than those of the embodiment of FIG. 1, and that provide one or more advantages by comparison with a conventional food waste disposer assembly such as that represented by FIG. 1. In particular, as described in further detail with respect to FIG. 3 through FIG. 17, several mounting assembly embodiments that are represented by (or encompassed by) the mounting assembly 208 of FIG. 2 are configured so as to enable the upper mounting flange 210 to be secured to the sink flange 214 without any retaining (or snap) ring being employed for such purpose. As described below, in these embodiments of the mounting assembly 208, the sink flange 214 has multiple protrusions or bumps formed on the outer perimeter of the sink flange, and the upper mounting flange 210 includes multiple lugs or extensions (or tabs) that are configured to interface with the protrusions so as to allow for the upper mounting flange to be secured relative to the sink flange. In one or more of these embodiments additional features are also present that facilitate such operation and/or provide other advantages.

Figure 3:
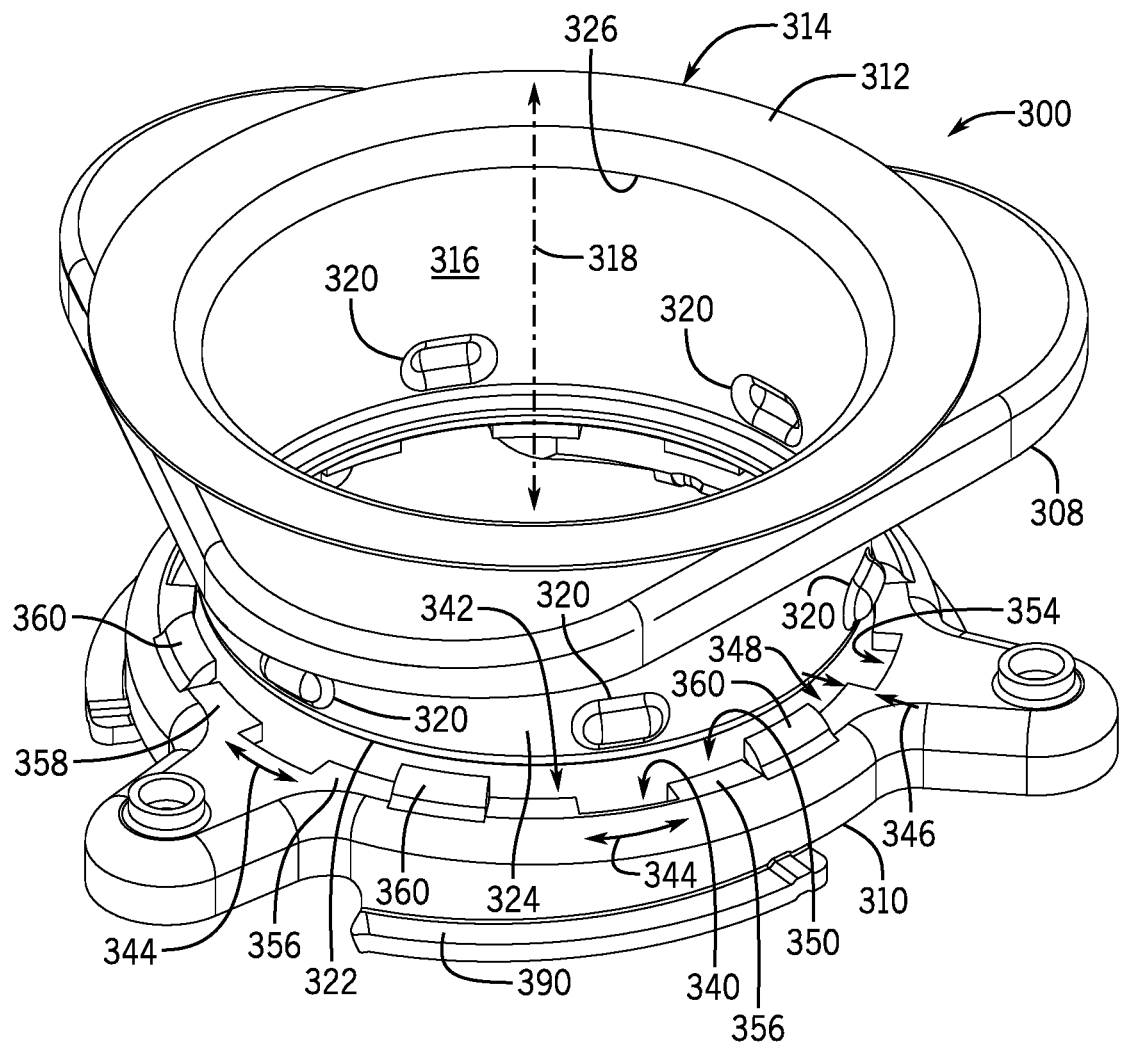
FIG. 3 is a perspective view of portions of a first embodiment of an improved mounting assembly represented by FIG. 2 in which the portions are shown to be in a first axial and rotational position relative to one another.

Turning to FIG. 3, a perspective view shows portions 300 of a first example embodiment of an improved mounting assembly encompassed by the improved mounting assembly 208 of FIG. 2, so as to highlight several features of that mounting assembly in particular. In this example, the portions 300 of the mounting assembly particularly include an upper mounting flange 310 that is one example of the improved upper mounting flange 210 shown in FIG. 2, as well as a sink flange 314 that is one example of the improved sink flange 214 of FIG. 2. Additionally, in this illustration, the portions 300 also include a back-up flange 308 that can take a form that is similar to that of the back-up flange 108 of FIG. 1.

To facilitate an understanding of the features and operation of the sink flange 314 and upper mounting flange 310, the portions 300 are shown independent of numerous other possible components or portions of the mounting assembly (e.g., the mounting assembly 208) and food waste disposer assembly (e.g., the food waste disposer assembly 200) of which those portions 300 would form a part. Further, the portions 300 are shown independent of any sink (e.g., the sink 202) or any other structure to which the mounting assembly encompassing the portions 300 would be attached, to facilitate an appreciation for the features and operation of the portions 300 in particular. Nevertheless, it should be recognized that, when implemented in relation to the sink such as the sink 202, a rim (or lip) 312 of the sink flange 314 will be positioned so as to rest upon an upper surface of a floor of the sink. Also, when so implemented, a tubular section (or extension or portion) 316 of the sink flange 314 will extend through an orifice formed within the floor of the sink, from the upper surface of the floor to a location beneath the floor of the sink, at which the tubular section can be coupled to a food waste disposer such as the food waste disposer 206 of the FIG. 2. When arranged in this manner, the back-up flange 308 can be positioned immediately beneath the floor of the sink, between the upper mounting flange 310 and the sink 202 (and also between the upper mounting flange 310 and the rim 312 of the sink flange 314 as shown in FIG. 3).

Further, it should be appreciated that ramps (or inclined mounting fasteners or edges or ridges) 390 extending from sides of the upper mounting flange 310 particularly are structures by which a food waste disposer such as the food waste disposer 206 can be directly or indirectly coupled to the upper mounting flange and the mounting assembly 208, and thus attached to a sink (or possibly another structure) by way of that mounting assembly. In at least some embodiments, the ramps 390 particularly allow for a lower locking ring or lower mounting flange such as the lower mounting flange 118 of FIG. 1 to be attached to the upper mounting flange 310 as described above in regard to FIG. 1, with a mounting gasket such as the mounting gasket 116 positioned between those two flanges. Assuming that the food waste disposer 206 (or other waste disposer) in turn is coupled to the lower mounting flange 118 as discussed above (e.g., by way of the mounting gasket 116), such an arrangement thus allows the waste disposer to be indirectly attached to the sink flange 314 by way of the upper mounting flange 310 and thereby indirectly attached by way of the mounting assembly 208 to a sink (or possibly another structure).

Figure 4:
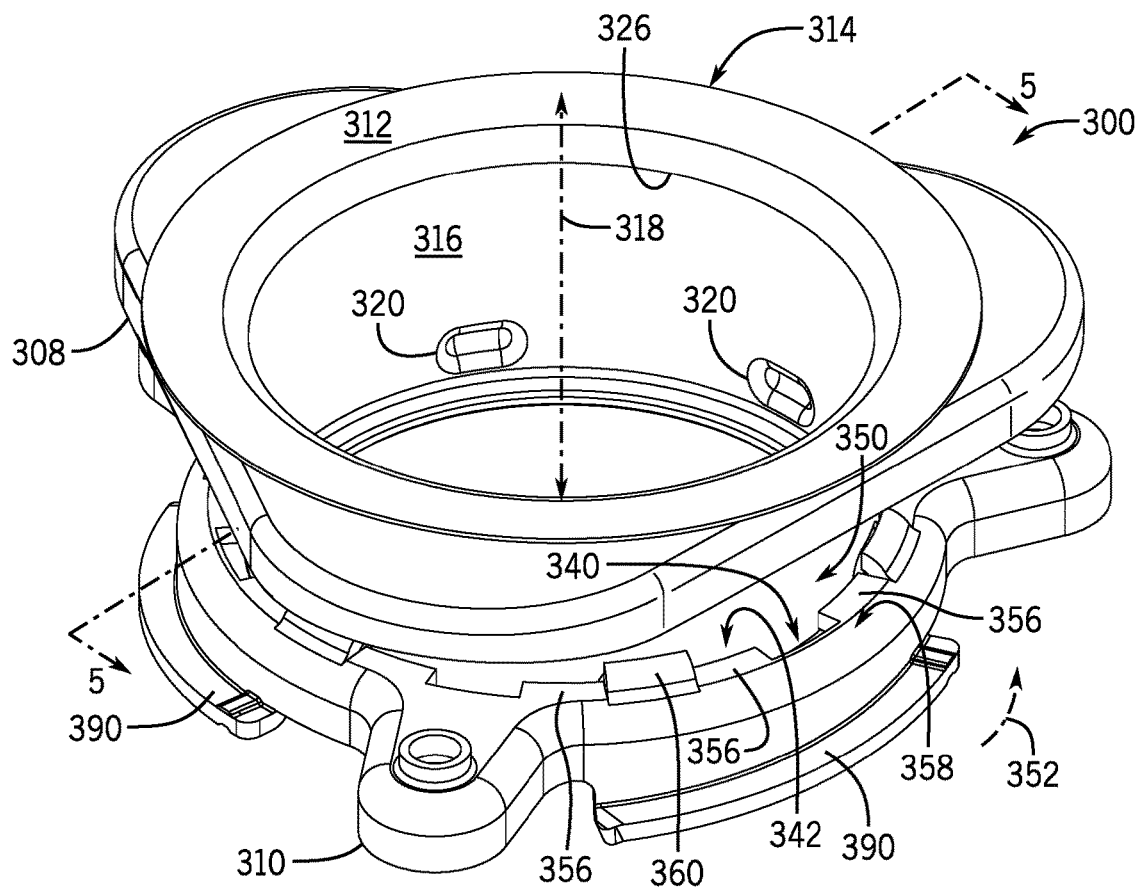
FIG. 4 is a perspective view of the portions of the improved mounting assembly of FIG. 3 in which the portions are shown to be in a second axial and rotational position relative to one another.
Figure 5:
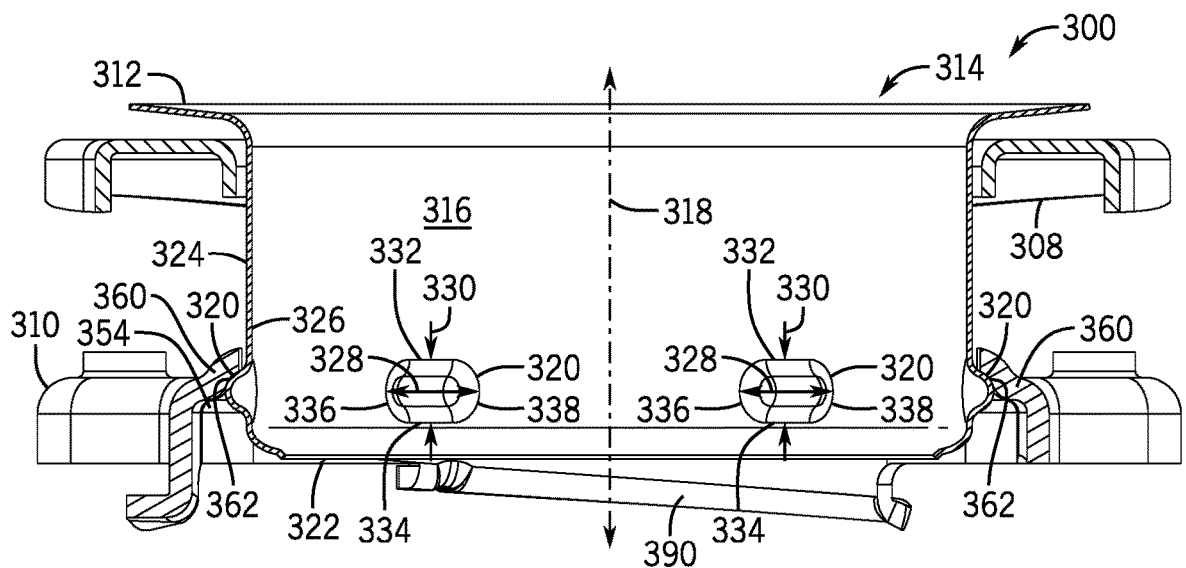
FIG. 5 is a cross-sectional view of the portions of the improved mounting assembly of FIG. 3 and FIG. 4, taken along a line 5-5 of FIG. 4.

In addition to FIG. 3, FIG. 4 and FIG. 5 are also provided to show additional views of the portions 300. More particularly, it should be appreciated that the upper mounting flange 310 can be rotated about an axis 318 shown in each of FIG. 3, FIG. 4, and FIG. 5 relative to the sink flange 314 (and the back-up flange 308), and while FIG. 3 shows the upper mounting flange 310 to have one rotational position relative to the sink flange 314, FIG. 4 and FIG. 5 show the portions 300 when the upper mounting flange 310 has a second rotational position relative to the sink flange 314.

In the present embodiment of FIG. 3, FIG. 4, and FIG. 5, it should be particularly appreciated that the sink flange 314 and the upper mounting flange 310 have complementary features that allow for the upper mounting flange to be secured to the sink flange by way of a three-step process described below. More particularly in this regard, the tubular section 316 of the sink flange 314 includes multiple (in this example, six) protrusions 320 that are spaced equidistantly around the outer perimeter of the tubular section 316, proximate a bottom edge 322 of the tubular section 316. Five of the protrusions 320 are particularly visible in FIG. 3 and four of the protrusions 320 are visible in FIG. 5. It should be appreciated that the sink flange 314 and the tubular section 316 thereof including the protrusions 320 thereof in the present embodiment are formed from a sheet metal material such as stainless steel. Given this to be the case, to form the protrusions 320 that protrude outward from an outer cylindrical surface 324 of the tubular section 316, there are corresponding dimples or indentations formed along an inner cylindrical surface 326 of that tubular section.

Further as shown, in the present embodiment, each of the protrusions 320 generally has a capsule-shaped form such that the respective protrusion has a respective width (or end-to-end arc length) dimension 328 that is larger than a respective height dimension 330, has respective top and bottom edges 332 and 334, respectively, and has respective left and right curved edges 336 and 338, respectively (as shown particularly in FIG. 5). In the present example, the top and bottom edges 332 and 334 particularly are parallel to a first plane defined by the bottom edge 322 of the tubular section 316, as well as parallel to a second plane defined by the rim 312. Given such an arrangement, and assuming a typical installation in which the axis 318 is vertically-oriented relative to the ground and perpendicular to the aforementioned first and second planes, the top and bottom edges 332 and 334 would extend in a horizontal direction relative to the ground, although in other installations and embodiments this need not be the case. Further, the protrusions 320 are generally arranged so as to coincide with, or be positioned at or proximate to, a third plane that is in between the aforementioned first and second planes respectively defined by the bottom edge 322 and rim 312, respectively, with the third plane being substantially closer to the first plane of the bottom edge than to the second plane of the rim.

In addition to the protrusions 320 provided on the sink flange 314, the upper mounting flange 310 further has complementary features that allow for the upper mounting flange to engage and become secured to the sink flange by way of the protrusions 320. In particular, as shown in FIG. 3, the upper mounting flange 310 includes multiple (in this example, six) indentations or relief cuts (or indentation formations) 340. The indentations 340 are spaced equidistantly around an inwardly-facing surface or inner circumference 342 of the upper mounting flange 310 that defines an orifice 350 into which the tubular section 316 of the sink flange 314 can be positioned (see also FIG. 4).

As illustrated, each of the indentations 340 has a respective width (or arc length or length) 344 that is substantially the same as, or slightly larger than, the width dimension 328 of the protrusions 320. Further, each of the indentations 340 has a depth dimension 346, in terms of a radial extent outward from a radially-innermost edge portion 348 of the inner circumference 342, which is equal to or greater in extent than the distance each of the protrusions 320 extends outwardly from the outer cylindrical surface 324 of the tubular section 316. Given these features, it should be appreciated from FIG. 3 that, when the protrusions 320 are respectively aligned with respective ones of the indentations 340 as shown in FIG. 3, it is possible to move the upper mounting flange 310 axially along the axis 318 toward the sink flange 314 such that the tubular section 316 of the sink flange enters the orifice 350 and particularly the respective protrusions 320 are received within the respective indentations 340.

Referring particularly to FIG. 4, after the upper mounting flange 310 has been moved sufficiently far axially along the axis 318 relative to the sink flange 314 (toward the rim 312), such that the protrusions 320 respectively have passed into the indentations 340, respectively, it then becomes possible for the upper mounting flange 310 to be rotated about the axis 318 relative to the sink flange 314. In the present embodiment, rotation of the upper mounting flange 310 relative to the sink flange 314 as represented by an arrow 352 (e.g., counter-clockwise when viewing the portions 300 along the axis 318 from the side of the rim 312 toward the upper mounting flange, or viewing the assembly top down assuming a typical installation orientation) results in the axial securing of the upper mounting flange 310 relative to the sink flange 314, and along the axis 318. As discussed further below, the securing occurs as a result of such rotation due to relative engagement of additional features referred to as lugs 360 formed on the upper mounting flange 310 relative to the protrusions 320.

More particularly as shown, in the present example embodiment, the upper mounting flange 310 includes multiple (in this example, six) of the lugs 360 that are spaced equidistantly apart from one another along an upper surface 358 of the upper mounting flange 310, where the upper surface 358 is the surface of the upper mounting flange that is generally orientated toward the rim 312 during installation rather than away from the rim. In the present embodiment, the lugs 360 are respectively positioned in between neighboring ones of the indentations 340 of the upper mounting flange 310, such that the indentations 340 and lugs 360 generally alternate with one another as one proceeds around the upper mounting flange and the inner circumference 342 thereof.

Further, as is evident from FIG. 4 (as well as FIG. 3), each of the lugs 360 is separated from each of the neighboring ones of the indentations 340 by a respective inner ridge portion 356 of the upper mounting flange 310. It should be appreciated that, although each of the ridge portions 356 has an inner-most edge that corresponds to the inner circumference 342, each of the respective ridge portions 356 overhangs a region or channel 354 beneath that ridge portion (that is, farther away from the upper surface 358) that links the neighboring one of the indentations 340 adjacent to that ridge portion with the neighboring one of the lugs 360 also adjacent to that ridge portion (see for example one of the channels 354 that is visible in FIG. 3). By virtue of the channels 354 respectively formed beneath the respective ridge portions 356, the protrusions 320 can proceed from being aligned with the respective indentations 340 to being aligned with the respective lugs 360 by passing through the respective channels 354 when the upper mounting flange 310 is rotated relative to the sink flange 314.

Referring particularly to FIG. 5, the cross-sectional view of the portions 300 taken along a line 5-5 of FIG. 4 reveals in further detail the shape of the lugs 360 and the manner in which the lugs interface with the protrusions 320 when the upper mounting flange 310 is rotated sufficiently relative to the sink flange 314 such that the protrusions engage the lugs. More particularly as shown, the respective lugs 360 extend upward from the upper surface 358 of the upper mounting flange 310 in an arched manner extending both axially away (along the axis 318) from that surface 358 and radially inwardly. Each of the respective lugs 360 includes a respective inner contact surface 362 that is curved so as to generally follow the external rounded contour of a respective one of the protrusions 320 when the upper mounting flange 310 is rotated so that the respective protrusion comes into contact with the respective lug. It should be appreciated from FIG. 5 that, when the protrusions 320 are positioned so as to be rotationally aligned with the respective lugs 360 and in contact with those lugs, the mounting flange 310 becomes assembled to and secured relative to the sink flange 314.

In view of the above, it should be appreciated that the portions 300 can be assembled such that the upper mounting flange 310 is secured to the sink flange 314 by virtue of a three-step process. The process particularly includes: (1) positioning the upper mounting flange 310 so that the bottom edge 322 of the tubular section 316 is aligned with and positioned for entry into (or begins entering) the orifice 350, (2) moving the upper mounting flange 310 axially along the axis 318 toward the rim 312 of the sink flange 314 so that the protrusions 320 proceed into the indentations 340, and (3) then rotating the upper mounting flange 310 relative to the sink flange 314 about the axis 318 so that the protrusions 320 respectively pass from being within the respective indentations 340, through the respective channels 354, and into rotational alignment with the respective lugs 360, such that the lugs 360 are in contact with the respective protrusions and positioned between the respective protrusions and the rim 312.

Relatedly, it will be appreciated that, in this embodiment, the upper mounting flange 310 can be disassembled/released from the sink flange 314 by performing the above-described steps in reverse. That is, to remove the upper mounting flange 310 from the sink flange 314 when starting from the state in which those components are assembled and secured relative to one another, one would (1) rotate (e.g., in a clockwise direction counter to the direction of the arrow 352) the upper mounting flange 310 about the axis 318 relative to the sink flange 314 so that the protrusions 320 respectively pass through the respective channels 354 so as to become aligned with the respective indentations 340 rather than the respective lugs 360, (2) moving the upper mounting flange 310 axially away from the rim 312 of the sink flange 314 so that the protrusions 320 pass through the indentations 340, and (3) taking or moving the upper mounting flange 310 away from the tubular section 316 of the sink flange 314 after the entire tubular section including the bottom edge 322 thereof has left the orifice 350.

It should be appreciated that, notwithstanding the above description concerning the portions 300 of FIG. 3, FIG. 4, and FIG. 5, the present disclosure is intended to encompass numerous other embodiments. For example, although in the previously-described embodiment the upper mounting flange 310 becomes secured relative to the sink flange 314 by rotating the upper mounting flange in a counter-clockwise direction corresponding to the direction of the arrow 352 relative to the sink flange 314, in other embodiments, securing can be accomplished by rotating the upper mounting flange relative to the sink flange in the opposite direction and, correspondingly, releasing of the upper mounting flange from the sink flange would involve rotation in the counter-clockwise direction. Also, although in the embodiment of FIG. 3, FIG. 4, and FIG. 5, the protrusions 320 take a capsule-shaped form as described above, in other embodiments the shapes of the protrusions can be different. For example, in some alternate embodiments, the protrusions can have an oval shape, a cylindrical shape, a circular shape, or a rectangular or substantially-rectangular shape.

Additionally, although not described above, it should also be recognized that in some embodiments the contact surfaces 362 of the lugs 360 and/or the interfacing surfaces of the protrusions 320 can be ones in which the levels of the respective surfaces as viewed along the axis 318 can vary slightly as one proceeds rotationally along those surfaces. Such surface variation of the contact surfaces 362 and/or the interfacing surfaces can in some embodiments be complementary and, in other embodiments, only certain of those surfaces will have any variation. In some such embodiments having such surface variation, rotation of the upper mounting flange 310 relative to the sink flange 314 during installation can have a screw-type tightening effect (and, inversely, rotation in the opposite direction during removal can have a loosening effect).

Figure 23:
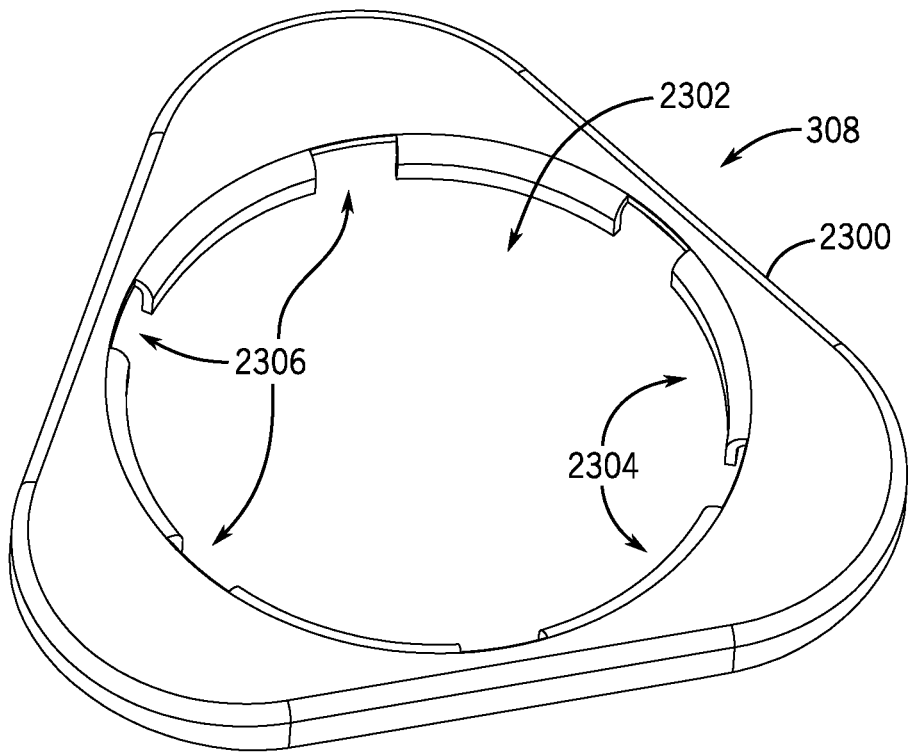
FIG. 23 is a top perspective view of an example back-up flange that can be employed as part of any of several of the improved mounting assemblies described herein, including for example the improved mounting assembly of FIG. 3.
Figure 24:
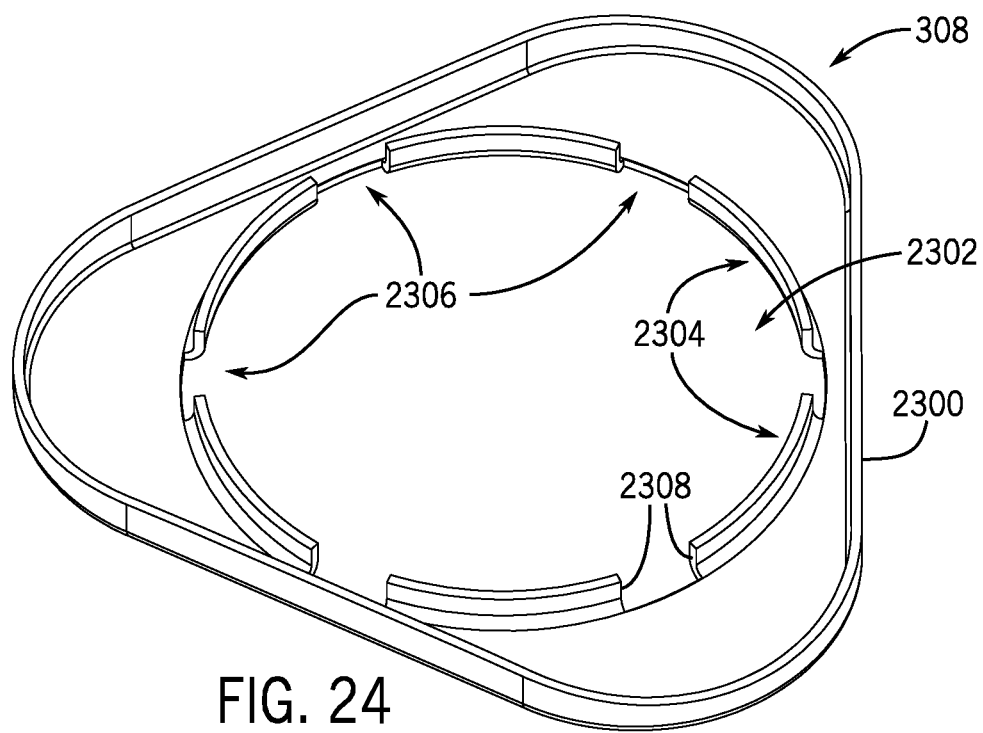
FIG. 24 is a bottom perspective view of the example back-up flange shown in FIG. 23.

Referring additionally to FIG. 23 and FIG. 24, it should be appreciated that the back-up flange 308 that can be employed among the portions 300 of the improved mounting assembly of FIG. 3, FIG. 4, and FIG. 5 can take a form that is somewhat different from that of the back-up flange 108 of FIG. 1. In particular, although an outer perimeter 2300 of the back-up flange 308 can be identical or substantially the same as that of the back-up flange 108, an inner orifice 2302 of the back-up flange 308 is defined by a combination of six radially inwardly-extending protrusions 2304 and six radially outwardly-extending indentations 2306, which alternate with one another as one proceeds circumferentially around the inner orifice 2302. In particular, each of the indentations 2306 is positioned in between a respective neighboring pair of the protrusions 2304, and vice-versa. As is evident from a bottom perspective view of the back-up flange 308 that is shown in FIG. 24 (in contrast to FIG. 23, which provides a top perspective view of that flange), each of the protrusions 2304 particularly not only extends radially-inwardly, away from the outer perimeter 2300 and toward a center of the inner orifice 2302 (e.g., toward the axis 318 of FIG. 3), but also includes a respective downwardly-extending lip 2308 (which is upwardly-extending as shown in FIG. 24 given the inverted orientation of the back-up flange 308 shown therein).

It should be appreciated that the present example embodiment of the back-up flange 308 can differ from the back-up flange 108 particularly in that the back-up flange 308 includes the indentations 2306. The indentations 2306 are arranged as interruptions on the inner diameter of the back-up flange to accommodate the presence of the protrusions 320 on the tubular extension 316 of the sink flange 314 and to thereby permit assembly of the back-up flange in relation to the sink flange. More particularly, it will be recognized that the back-up flange 308 can be assembled to the sink flange 314 by positioning the back-up flange so that the bottom edge 322 of the tubular section 316 is aligned with and positioned for entry into (or begins entering) the inner orifice 2302, and moving the back-up flange 308 axially along the axis 318 (see FIG. 3) toward the rim 312 of the sink flange 314 past the protrusions 320. It will be appreciated that the indentations 2306 are spaced apart from one another along the back-up flange 308 in a manner that is complementary to the spacing of the protrusions 320 around the tubular extension 316 such that, so long as the back-up flange 308 is angularly positioned relative to the tubular extension so that the protrusions 320 are aligned with the indentations 2306, the back-up flange can be moved along the tubular extension 316 past the protrusions 320 toward the rim 312.

Figure 6:
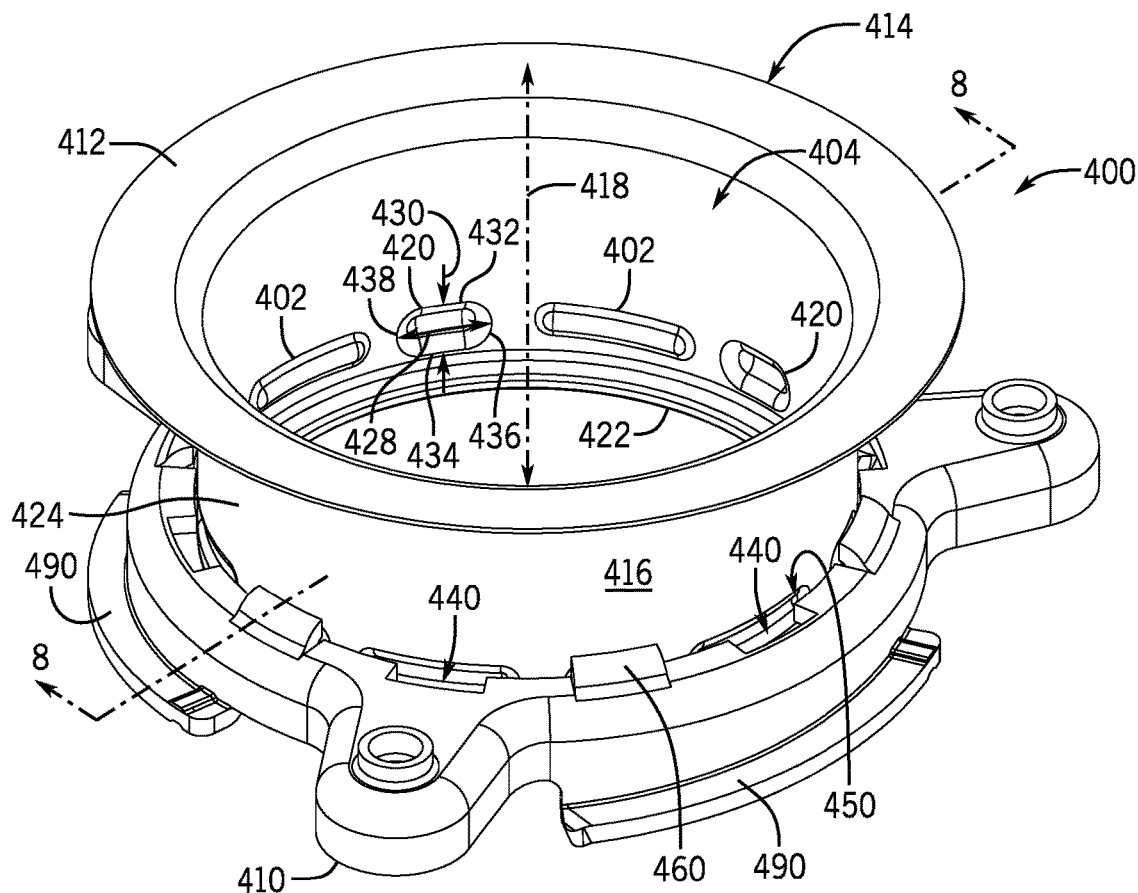
FIG. 6 is a perspective view of portions of a second embodiment of an improved mounting assembly represented by FIG. 2.
Figure 8:
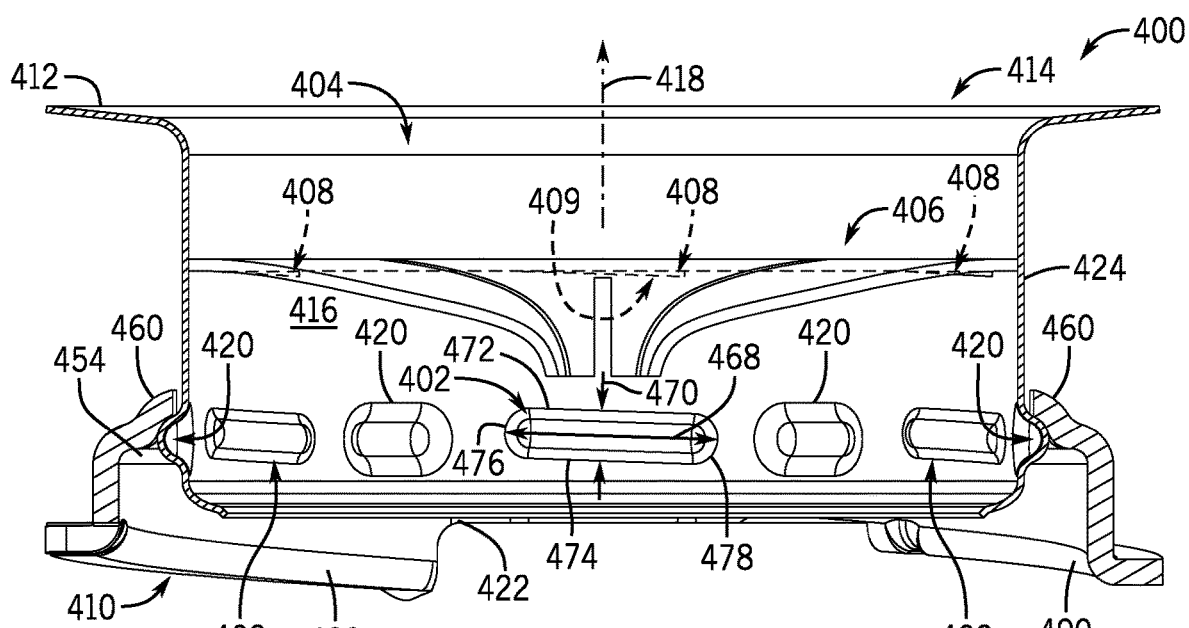
FIG. 8 is a cross-sectional view of the portions of the improved mounting assembly of FIG. 6 and FIG. 7, taken along a line 8-8 of FIG. 6, in which the portions that are shown in FIG. 8 (in contrast to FIG. 6 and FIG. 7) additionally include a baffle.
Figure 7:
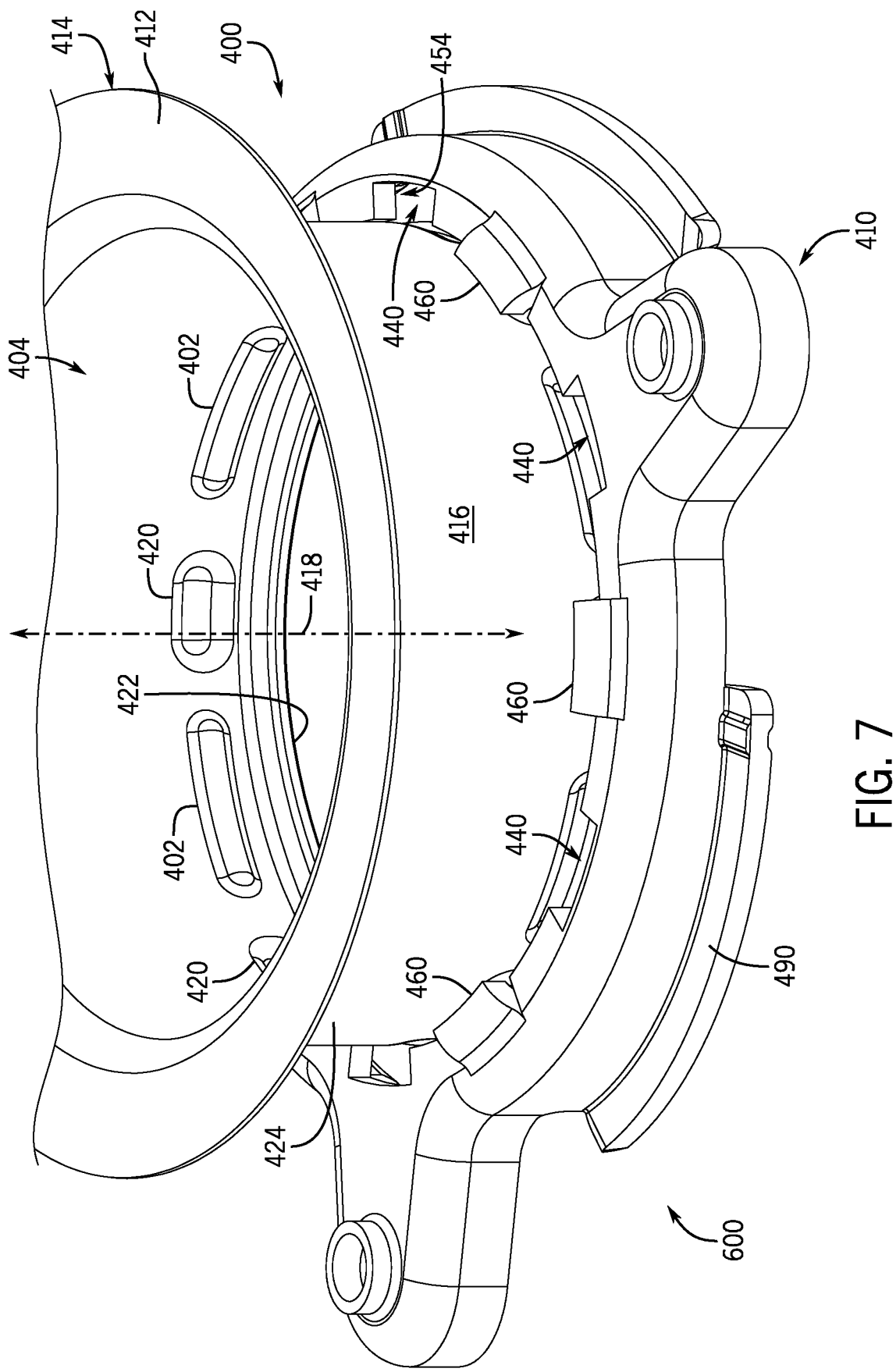
FIG. 7 is a perspective, partly cutaway view of the portions of the improved mounting assembly of FIG. 6 in which the perspective view is rotated relative to that of FIG. 6.

Notwithstanding the above description concerning the portions 300 of FIG. 3, FIG. 4, and FIG. 5, the present disclosure is also intended to encompass other embodiments of food waste disposer assemblies and associated mounting assemblies that are encompassed by the food waste disposer assembly 200 of FIG. 2 and particularly the mounting assembly 208 thereof. Referring next to FIG. 6, FIG. 7, and FIG. 8, portions 400 of a second example mounting assembly that can be encompassed by the mounting assembly 208 of FIG. 2 are shown by way of a perspective view, a cutaway perspective view, and a cross-sectional view, respectively. The perspective view provided by FIG. 7 shows the portions 400 rotated slightly about an axis 418 by comparison with the portions 400 as shown in FIG. 6. As will be described in further detail below, FIG. 8 not only shows a cross-sectional view of the additional portions 400 as shown in FIG. 6, but also shows a cross-sectional view of a further portion that is a baffle 406 that is not shown in FIG. 6 (or FIG. 7), and that baffle also can be considered to be among the additional portions 400 even though not shown in FIG. 6 (or FIG. 7).

It should be appreciated from inspection of FIG. 6, FIG. 7, and FIG. 8 relative to FIG. 3, FIG. 4, and FIG. 5 that the portions 400 include components that are identical or substantially or largely similar in many respects. In particular, the portions 400 include a sink flange 414 having each of a rim 412, a tubular section (or extension or portion) 416 extending about an axis 418, and multiple (in this case, again, six) protrusions 420 spaced equidistantly around an outer cylindrical surface 424 of the tubular section, which are located closer to a bottom edge 422 of the tubular section than to the rim 412. FIG. 6 shows each of the protrusions 420 as having a width dimension 428, a height dimension 430, a top edge 432, a bottom edge 434, a left curved edge 436, and a right curved edge 438 (as viewed from outside of the tubular section 416) that respectively correspond to the width dimension 328, height dimension 330, top edge 332, bottom edge 334, left curved edge 336, and right curved edge 338 of the protrusions 320 of FIG. 5.

Also, the portions 400 include an upper mounting flange 410 having indentations 440 and lugs 460, as well as channels 454 linking those indentations and lugs, and an orifice 450 within the upper mounting flange 410 that can receive the tubular section 416 of the sink flange 414. Further, it should be appreciated that ramps (or inclined mounting fasteners or edges or ridges) 490 extending from sides of the upper mounting flange 410 particularly are structures by which a food waste disposer such as the food waste disposer 206 can be directly or indirectly coupled to the upper mounting flange (e.g., by way of a lower mounting flange as discussed above) and the overall mounting assembly, and thus attached to a sink (or possibly another structure). These components/features 410, 412, 414, 416, 418, 420, 422, 424, 440, 450, 454, 460, and 490 of FIG. 6, FIG. 7, and FIG. 8 respectively correspond to, and are identical or substantially similar to, the components/features 310, 312, 314, 316, 318, 320, 322, 324, 340, 350, 354, 360, and 390 of FIG. 3, FIG. 4, and FIG. 5, respectively, except as described further below. Also, although the portions 400 are not shown as including a back-up flange corresponding to the back-up flange 308, such a back-up flange would often be present during installation by way of the portions 400.

Additionally, it should be appreciated that, in this embodiment of FIG. 6, FIG. 7, and FIG. 8, the upper mounting flange 410 is secured relative to the sink flange 414 in substantially the same manner as was described with respect to the embodiment of FIG. 3, FIG. 4, and FIG. 5. In particular, the protrusions 420, indentations 440, and lugs 460 permit the securing of the upper mounting flange 410 relative to the sink flange 414 by way of the same process as described above, namely, (1) positioning the upper mounting flange 410 so that the bottom edge 422 of the tubular section 416 is aligned with and enters the orifice 450, (2) moving the upper mounting flange 410 axially along the axis 418 toward the rim 412 of the sink flange 414 so that the protrusions 420 proceed into the indentations 440, and (3) then rotating the upper mounting flange 410 relative to the sink flange 414 about the axis 418 so that the protrusions 420 pass through the channels 454 and into alignment with the lugs 460 such that the lugs 460 are positioned between those protrusions and the rim 412. Likewise, disassembly of the upper mounting flange 410 from the sink flange 414 entails the reverse of this process.

Notwithstanding the similarities between the portions 400 and portions 300, the portions 400 do have a significant additional feature relative to the portions 300 in that the sink flange 414 further includes multiple (in this example, again, six) additional protrusions 402 also formed along the tubular section 416. As shown, the additional protrusions 402 are orientated inversely relative to the protrusions 420 in that, while the protrusions 420 extend outward from the outer cylindrical surface 424, the additional protrusions 402 instead extend inwardly into the tubular section, into an internal passage 404 of the sink flange 414 toward the axis 418. Further as shown, the additional protrusions 402 are positioned at the same axial location along the axis 418 as are the protrusions 420, and each of the additional protrusions 402 is respectively positioned midway in between a respective pair of neighboring ones of the protrusions 420 (and vice versa) arranged along the tubular section 416. It should be recognized that the back-up flange 308 described above would still be suitable for use with the sink flange 414, notwithstanding the presence of both the protrusions 420 and the additional protrusions 402, given that the additional protrusions 402 are inwardly-extending.

Referring additionally to FIG. 8, a cross-sectional view of the portions 400, taken along a line 8-8 of FIG. 6, is additionally provided. The particular cross-sectional view provided in FIG. 8 is analogous to that shown in FIG. 5, and particularly illustrates how two of the protrusions 420 are positioned within or under, so as to be in contact with, two of the lugs 460 when the upper mounting flange 410 is secured relative to the sink flange 414. FIG. 8 also illustrates more particular features of the additional protrusions 402. In particular, it can be seen that the additional protrusions 402 (as with the protrusions 420) are capsule-shaped, although in other embodiments the additional protrusions can have other shapes (e.g., oval/elliptical, cylindrical circular, rectangular, or substantially rectangular shapes). Given the capsule-shape of the additional protrusions 402, each of the additional protrusions includes a respective width dimension 468 and a respective height dimension 470, where the width dimension is substantially greater than the height dimension. Also, each of the protrusions 402 includes top and bottom edges 472 and 474, respectively, which are both linear, as well as left and right curved edges 476 and 478, respectively. It should be further noted that, in this embodiment, the top and bottom edges 472 and 474 are not exactly horizontal or parallel to a plane formed by the bottom edge 422 of the tubular section 416, but rather are slightly sloped, for reasons described further below. Nevertheless, in other embodiments, the top and bottom edges 472 and 474 can be parallel to the plane formed by the bottom edge 422 or arranged in another manner.

As mentioned above, FIG. 8 (in contrast to FIG. 6 or FIG. 7) shows an additional portion, namely the baffle 406, to be positioned within the internal passage 404 of the sink flange 414, and this baffle can be considered to be among the portions 400. As should be appreciated, the baffle 406 can be a removable baffle formed from rubber (e.g., nitrile rubber) or other flexible material(s) (e.g., polypropylene, nylon, or a thermoplastic elastomer (TPE)) such that, when implemented as part of a food waste disposer assembly such as the food waste disposer assembly 200, the baffle can restrict or otherwise influence or affect the passage of food or other waste from the sink into and out of the food waste disposer. In FIG. 8, the baffle 406 is not shown to be fully in position relative to where it would be positioned upon being fully implemented relative to the sink flange 414, but rather is shown to be positioned within the internal passage 404 slightly above the position it would take when fully implemented. That is, the baffle 406 is shown to be axially moved away from the bottom edge 422 of the tubular section 416 toward the rim 412 of the sink flange 414 along the axis 418 relative to where it would be when fully implemented in the sink flange 414.

In the present example embodiment, the additional protrusions 402 are particularly configured to serve as a support for the baffle 406 when the baffle is fully implemented. As shown by dashed lines, the baffle 406 includes multiple (in this example, six) support features 408 positioned around an outer rim of the baffle 406. In the example shown in FIG. 8, the support features 408 are configured particularly to rest upon the additional protrusions 402 when the baffle is moved axially toward the bottom edge 422 away from the rim 412 of the sink flange 414 such that the support features contact the additional protrusions 402. In the present embodiment, the support features 408 particularly are configured to have sloped underside edges 409. In this manner, the support features 408 are complementary in shape to the additional protrusions 402 given that the top edges 472 of the additional protrusions are sloped as described above. Consequently, when the support features 408 are resting on the top edges 472 of the additional protrusions 402, the baffle 406 (and particularly an outer rim of the baffle) takes on a position that is parallel or substantially parallel to the bottom edge 422 of the tubular section 416.

Notwithstanding the embodiment shown in FIG. 8, a baffle suited for engaging the additional protrusions 402 can take other forms as well. For example, in an additional embodiment, an outer rim or perimeter of such a baffle can have multiple dimples (or indentations or negative features) arranged around that outer rim or perimeter that respectively correspond to, in terms of their respective positions relative to, and that are respectively complementary in shape relative to, the respective additional protrusions 402. Further for example, with respect to the sink flange 414 having six of the capsule-shaped additional protrusions 402, a baffle with an outer rim having six complementary inverted-capsule-shaped dimples would be appropriate. Such a baffle would be implemented in relation to the sink flange 414 by pushing the baffle into place within the sink flange such that the additional protrusions 402 snapped into the corresponding dimples on the baffle perimeter. Since such a baffle would be elastomeric, it would deform to allow this mating of the dimples on the baffle perimeter with the additional protrusions 402. Further, when so positioned, the dimples would surround the additional protrusions 402 and increase the resistance to baffle movement up or down along the axis 418 (e.g., vertically). Such a manner of implementation would be advantageous insofar as it would resemble in feel, as perceived by an installer, the feel of a conventional arrangement in which a baffle can be implemented or locked in relation to a strainer flange by way of a complementary snap ring groove arrangement (e.g., in which a groove circumferentially extending around one of the baffle or the inner perimeter of the strainer flange is configured to mate with a complementary annular formation circumferentially extending about the other of those components).

It should be appreciated that, by virtue of this arrangement in which the additional protrusions 402 have the features described above, the sink flange 414 is particularly configured to support and engage baffles such as the baffle 406 that are complementary to one or more of the features of the additional protrusions 402. More particularly, in embodiments in which the additional protrusions 402 are capsule-shaped and have top edges 472 that are sloped as described above, the sink flange 414 is configured to support and engage baffles with support features that have one or more complementary characteristics such as, for example, the particular sloped shape of the support features 408, or the complementary inverted-capsule-shape of the dimples also discussed above. However, to the extent that the additional protrusions take on a different shape, baffles with support features having a different configuration than those suitable for the sink flange 414 (e.g., different from the support features 408 or the complementary inverted-capsule-shaped dimples described above) will be appropriate for use with the sink flange having those additional protrusions. For example, if the top edges 472 of the additional protrusions 402 are parallel to the bottom edge 422 of the sink flange 414, then that arrangement will be appropriate for a baffle having complementary support features (for example, having bottom edges that were horizontal or parallel to the rim of the baffle). In this manner, only certain versions of baffles will be suited for the sink flange 414, and other versions of baffles will not fit properly with respect to the sink flange.

Figure 9:
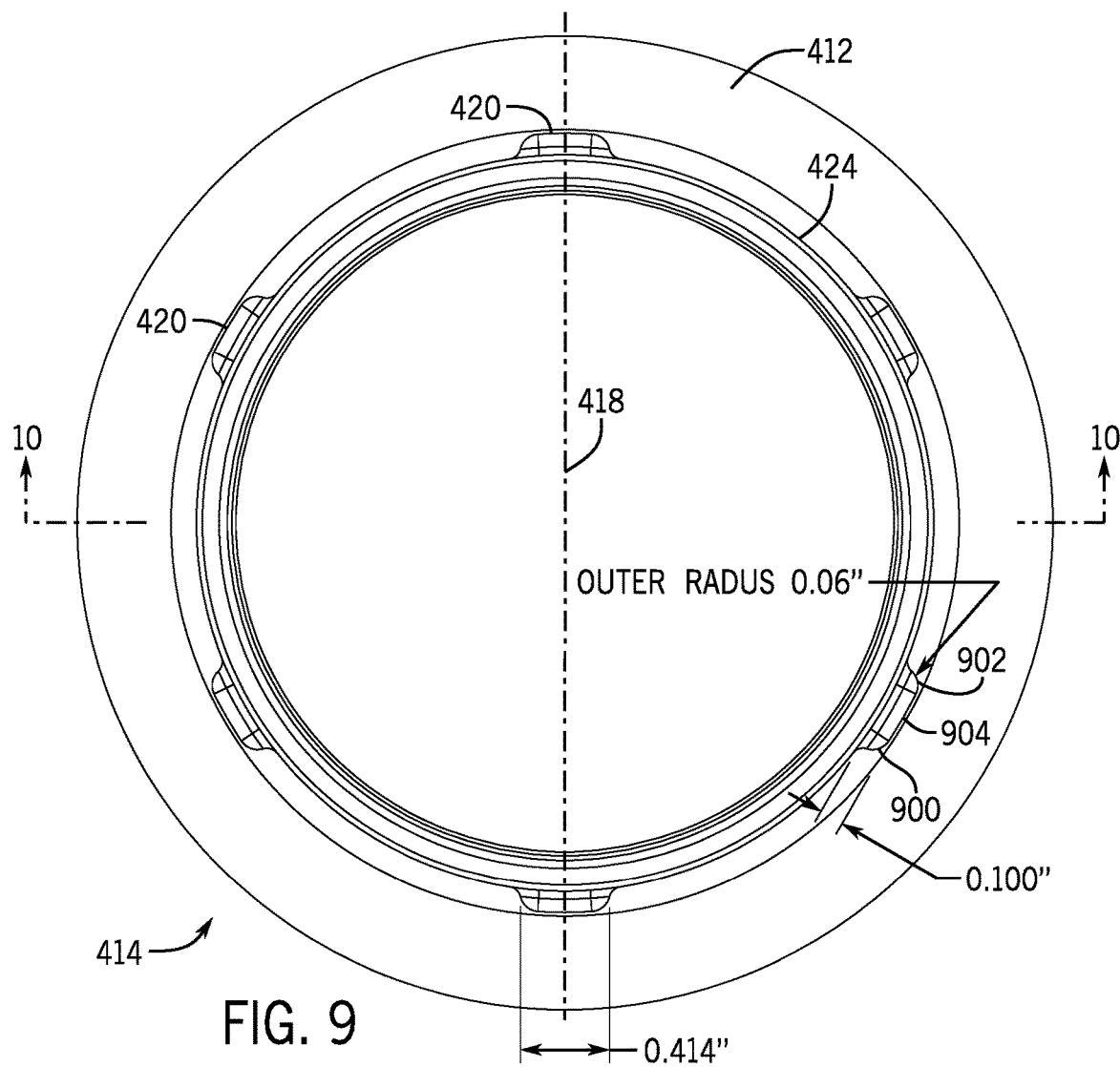
FIG. 9 is a bottom plan view of a sink flange component of the improved mounting assembly of FIG. 6, FIG. 7, and FIG. 8.
Figure 10:
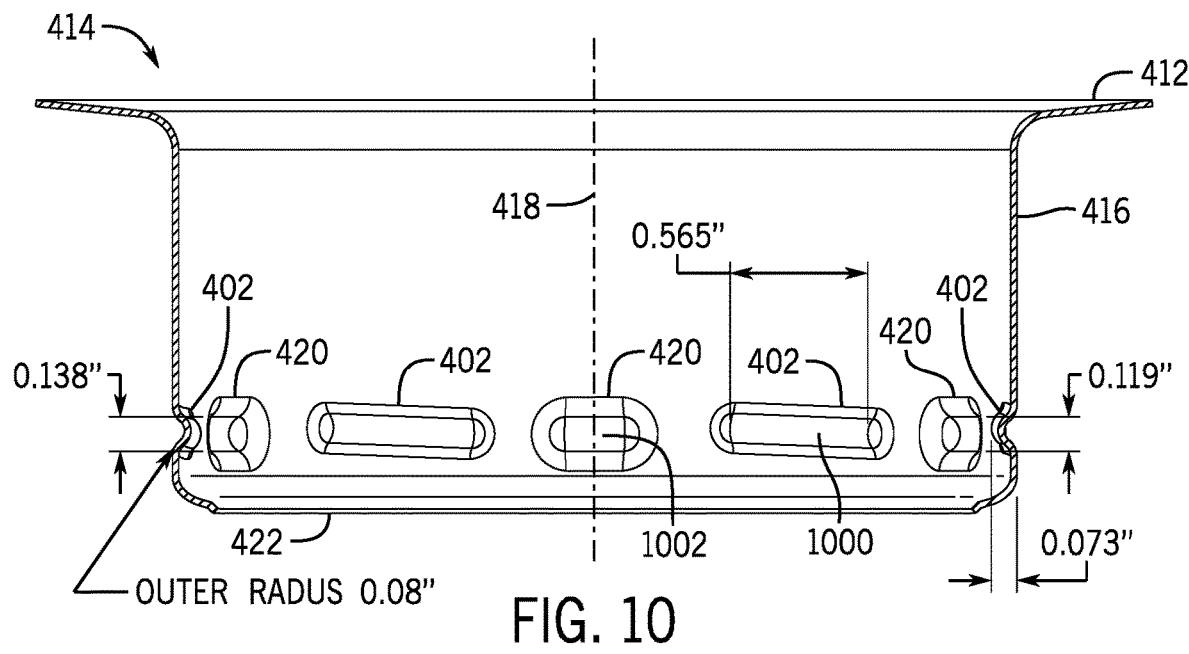
FIG. 10 is a cross-sectional view of the sink flange component of FIG. 9, taken along a line 10-10 of FIG. 9.

To provide further example details of the sink flange 414 and particularly the protrusions 420 and additional protrusions 402 thereof, FIG. 9 and FIG. 10 are provided, which respectively show a bottom plan view of the sink flange 414 and a side elevation view of the sink flange taken along a line 10-10 of FIG. 9. FIG. 9 particularly shows that, in the present embodiment, each of the protrusions 420 extends outward from the outer cylindrical surface 424 by a distance of 0.1 inches. It can be seen that each of the protrusions 420 extends outward by first and second radiused edges 900 and 902, which are then linked by a curved (approximately straight) circumferential perimeter segment or edge 904. Also in the present embodiment, the radiused edges each have an outer radius of 0.06 inches and the overall width of each of the protrusions 420 corresponding to the width dimension 428 of each of those protrusions as shown in FIG. 6 in the present example is 0.414 inches. The radiused edges 900 and 902 generally correspond in extent with the curved edges 436 and 438, and the edge 904 generally corresponds in extent with the top and bottom edges 432 and 434.

As for FIG. 10, in that cross sectional view additional example dimensions are shown for the additional protrusions 402. In particular, FIG. 10 shows that each of the protrusions 402 has an outer radius of 0.08 inches, and each of the top and bottom edges 472 and 474 has a length of approximately 0.565 inches. Also, an inner flat portion 1000 of each of the additional protrusions 402, which is the innermost portion of the respective additional portion, has a height of approximately 0.119 inches, with a difference between that dimension and the overall height dimension 470 being provided by the radiused aspect. Also, an inner flat portion 1002 of the protrusions 420 in this embodiment has a dimension of 0.138 inches. The depth of each of the additional protrusions 402 is, in this embodiment, 0.073 inches. Further, although the aforementioned dimensions described in relation to FIG. 9 and FIG. 10 are provided as examples, it should be understood that the present disclosure is not at all limited to embodiments having any of these dimensions, but rather the present disclosure is intended to encompass numerous other embodiments having features with any of a variety of other dimensions.

Figure 11:
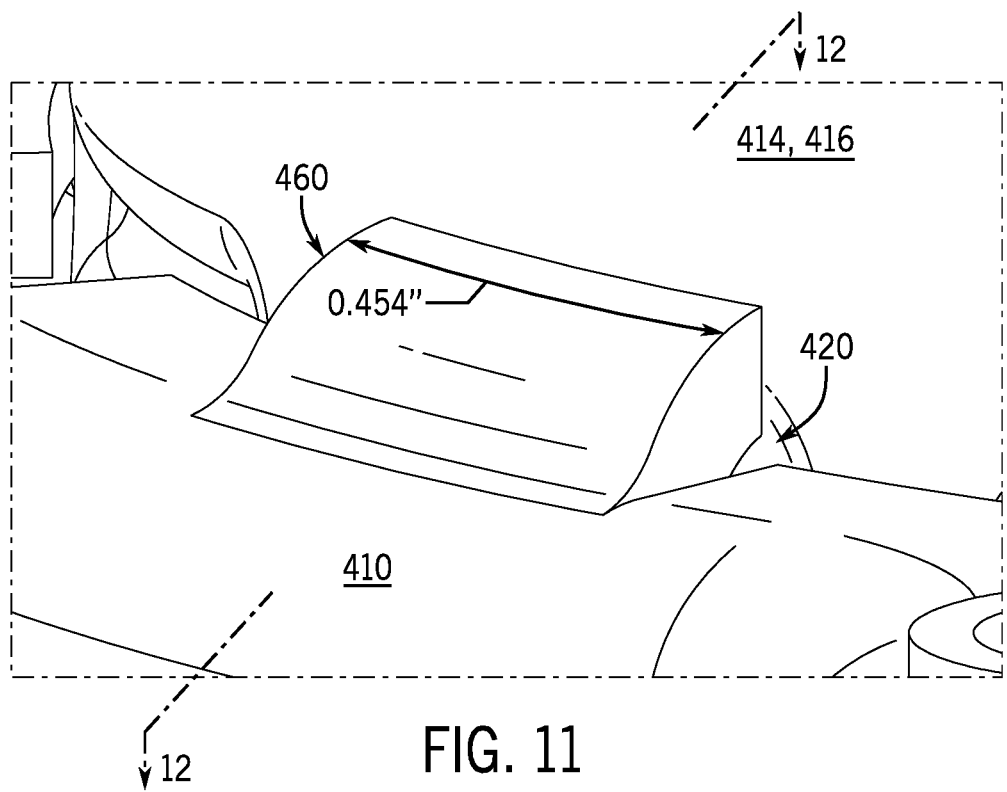
FIG. 11 is a detail perspective view of part of the improved mounting assembly of FIG. 6, which particularly highlights a lug component of that assembly.
Figure 12:
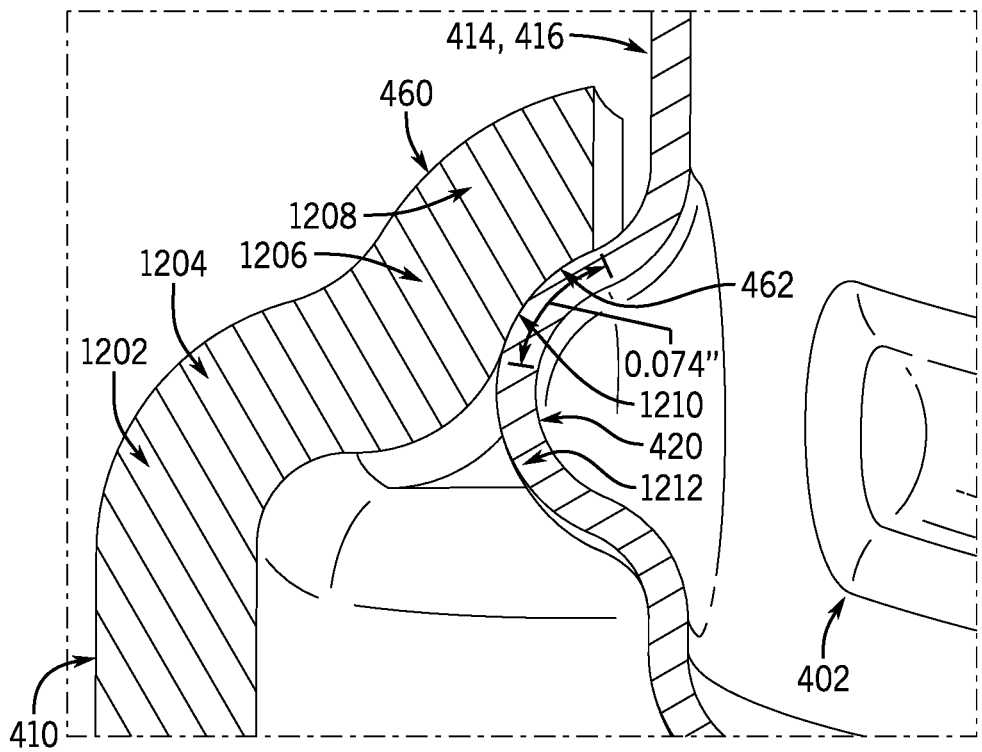
FIG. 12 is a cross-sectional view of the part of the improved mounting assembly of FIG. 11, taken along a line 12-12 of FIG. 11.
Figure 13:
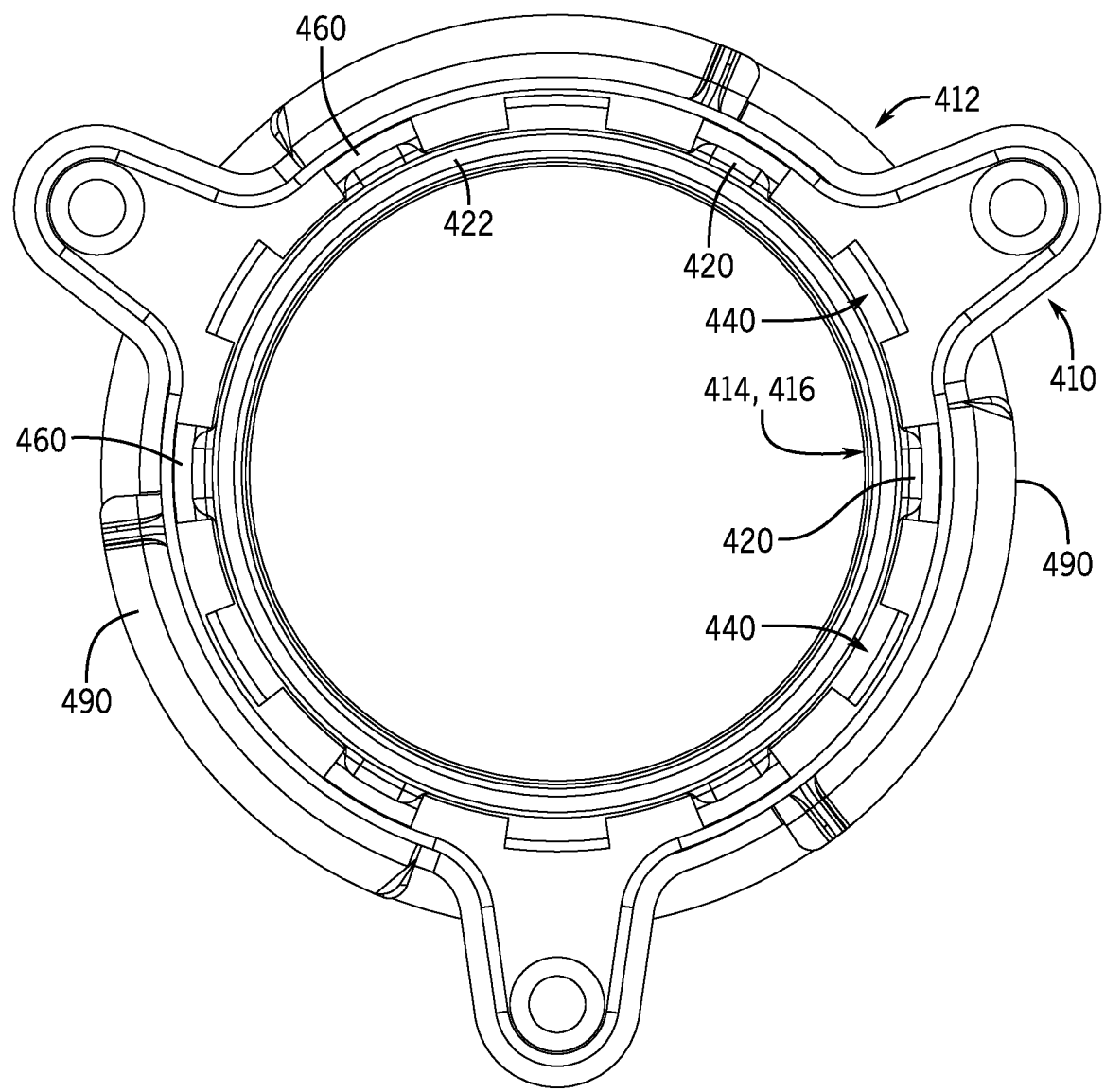
FIG. 13 is an additional bottom plan view of the portions of the improved mounting assembly of FIG. 6.

Referring additionally to FIG. 11, FIG. 12, and FIG. 13, additional views are provided of aspects of the portions 400 shown in FIG. 7 through FIG. 10. In particular, FIG. 11 provides a perspective cutaway view of one of the lugs 460 interfacing one of the protrusions 420, and FIG. 12 shows a cross-sectional view taken along a line 12-12 of FIG. 11 illustrating in even further detail the lug 460 and protrusion 420 of FIG. 11 interfacing one another. As for FIG. 13, a further, bottom plan view of the portions 400 is further provided. In this view the protrusions 420 are shown to be engaged with the lugs 460 from a vantage point of looking from the upper mounting flange 410 and bottom edge 422 of the tubular section 416 of the sink flange 414 toward the rim 412 of the sink flange. Also visible in FIG. 13 are the indentations 440.

Further with respect to FIG. 12, it should be particularly evident from FIG. 12 how a contact surface 462 of the lug 460 shown therein interfaces the protrusion 420 shown therein (where the contact surface 462 also corresponds to one of the contact surfaces 362 of FIG. 5). Also evident from FIG. 12 is a shape of the lug 460, which is shown to have an undulating profile as it extends upward toward the rim 412 (not shown) of the sink flange 414, in a direction parallel to the axis 418, and also radially inwardly towards the sink flange. That is, the lug 460 is shown to include a first section 1202 that extends generally upwardly, a second section 1204 that extends generally radially inwardly, a third section 1206 that again extends generally upwardly, and a final section 1208 that again extends radially inwardly.

Given this shape, an upper curved region 1210 of the contact surface 462 of the lug 460 extending along the sections 1206 and 1208 particularly engages a counterpart contact surface 1212 of the protrusion 420. By virtue of the interfacing of the contact and counterpart contact surfaces 462 and 1212, respectively, the upper mounting flange 410 particularly is precluded from moving downwardly relative to the tubular section 416 of the sink flange 414, that is, precluded from moving away from the rim 412 toward the bottom edge 422 of the sink flange. In terms of example dimensions, in the present example as shown in FIG. 12, a tangent overlap distance (or contact surface length) over which the contact surface 462 and counterpart contact surface 1212 are in contact is 0.074 inches assuming that the radius on the protrusions 420 (or bumps) is 0.100 inches. Further, in the present example embodiment as shown in FIG. 11, the width of each of the lugs 460 (or extensions or tabs) is 0.454 inches. Again, although the aforementioned dimensions are provided as examples, it should be understood that the present disclosure is not at all limited to embodiments having any of these dimensions, but rather the present disclosure is intended to encompass numerous other embodiments having features with any of a variety of other dimensions.

Figure 14:
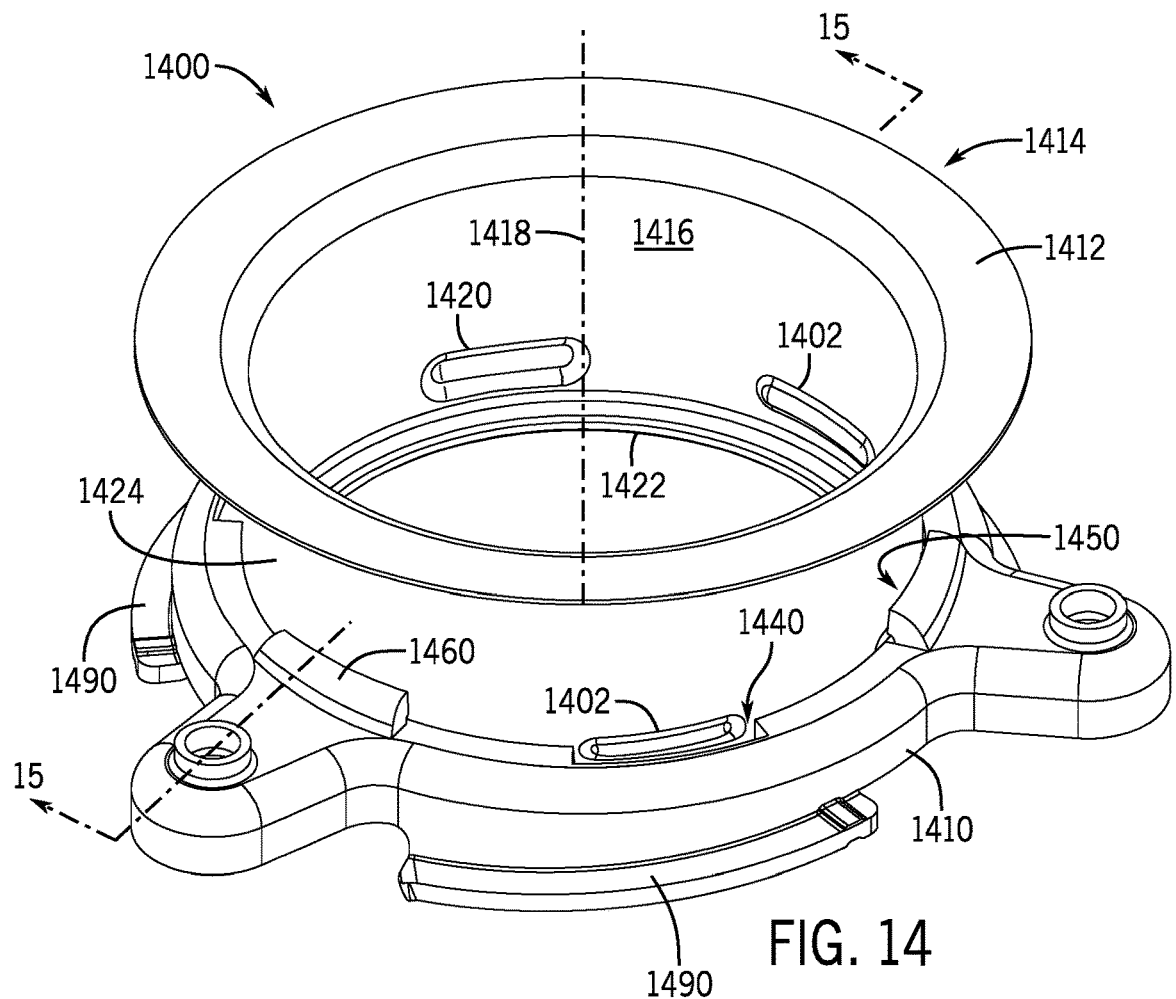
FIG. 14 is a perspective view of portions of a third embodiment of an improved mounting assembly represented by FIG. 2.
Figure 15:
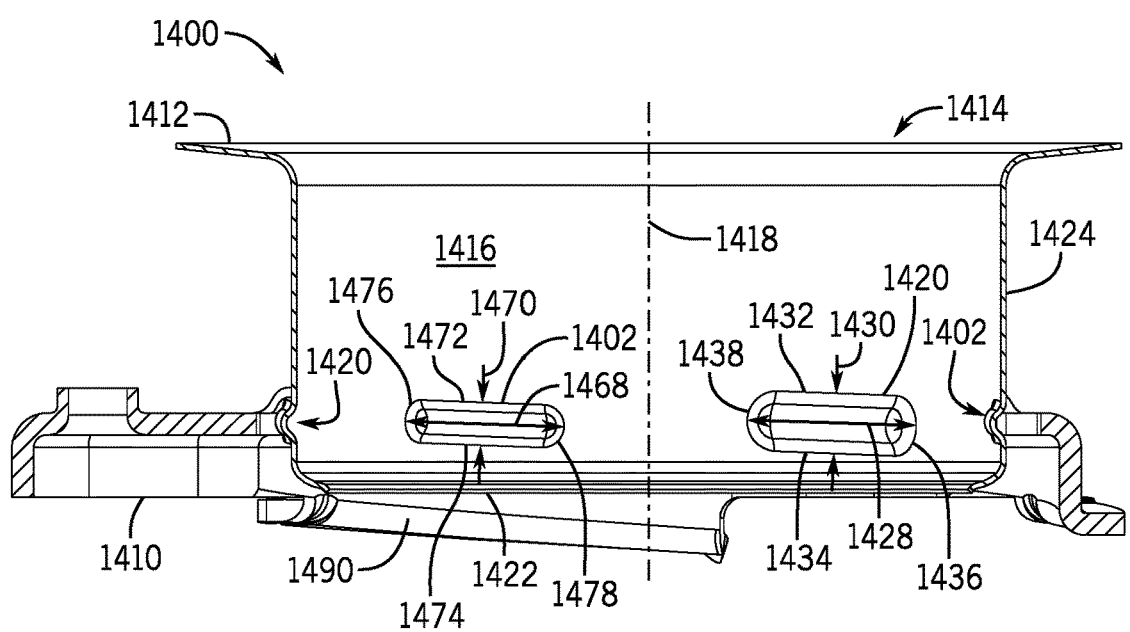
FIG. 15 is a cross-sectional view of the portions of the improved mounting assembly of FIG. 14, taken along a line 15-15 of FIG. 14.

Referring next to FIG. 14 and FIG. 15, portions 1400 of a third example mounting assembly that can be encompassed by the mounting assembly 208 of FIG. 2 are shown by way of a perspective view and in a cross-sectional view, respectively. Similar to the portions 400 shown in FIG. 6, FIG. 7, and FIG. 8, the portions 1400 do not include a back-up flange corresponding to the back-up flange 308, although it should be appreciated that such a back-up flange would typically be present during installation of a food waste disposer assembly by way of the portions 1400. Also, it should be appreciated from inspection of FIG. 14 and FIG. 15 relative to FIG. 6 and FIG. 8 that the portions 1400 include components/features that are identical or substantially or largely similar to those of the portion 400 in many respects. Indeed, as described further below, the portions 1400 include components/features 1402, 1410, 1412, 1414, 1416, 1418, 1420, 1422, 1424, 1440, 1450, 1454, and 1460 shown in FIG. 14 and FIG. 15 that respectively correspond to, and are identical or substantially similar to, the components/features 402, 410, 412, 414, 416, 418, 420, 422, 424, 440, 450, 454, and 460 shown in FIG. 6 and FIG. 8, respectively, except as described further below.

More particularly, the portions 1400 include a sink flange 1414 having each of a rim 1412, a tubular section (or extension or portion) 1416 coaxial about an axis 1418, and multiple protrusions 1420 spaced equidistantly around an outer cylindrical surface 1424 of the tubular section and located closer to a bottom edge 1422 of the tubular section than to the rim 1412. Each of the protrusions 1420 has a width dimension 1428, a height dimension 1430, a top edge 1432, a bottom edge 1434, a left curved edge 1436, and a right curved edge 1438 as viewed from the outside of the tubular section 1416 (note that FIG. 15 shows the curved edges from the inside, such that the curved edges are inverted), which respectively correspond to the width dimension 428, height dimension 430, top edge 432, bottom edge 434, left curved edge 436, and right curved edge 438 of the protrusions 420 of FIG. 6.

Also, the portions 1400 include an upper mounting flange 1410 having indentations 1440 and lugs 1460, as well as an orifice 1450 within the upper mounting flange 1410 that can receive the tubular section 1416 of the sink flange 1414. Although not clearly visible in FIG. 14 or FIG. 15, it should be understood that the portions 1400 also include channels corresponding to the channels 454 of the portions 400, which are formed in the upper mounting flange 1410 and link neighboring ones of the lugs 1460 and indentations 1440. Additionally, it should be appreciated that ramps (or inclined mounting fasteners or edges or ridges) 1490 extending from sides of the upper mounting flange 1410 particularly are structures by which a food waste disposer such as the food waste disposer 206 can be directly or indirectly coupled to the upper mounting flange and the overall mounting assembly (e.g., by way of a lower mounting flange as discussed above), and thus attached to a sink (or possibly another structure).

Further, the portions 1400 include multiple additional protrusions 1402 spaced equidistantly around the outer cylindrical surface 1424 of the sink flange 1414, at the same axial position along an axis 1418 as the protrusions 1420. Each of the additional protrusions 1402 is spaced equidistantly in between a respective pair of neighboring ones of the protrusions 1420 (and vice-versa). Also, each of the additional protrusions 1402 (as with the protrusions 420) is capsule-shaped. Given this capsule-shape, each of the additional protrusions 1402 includes a respective width dimension 1468 and a respective height dimension 1470, where the width dimension is substantially greater than the height dimension. Additionally, each of the additional protrusions 1402 further includes top and bottom edges 1472 and 1474, respectively, which are both linear, as well as left and right curved edges 1476 and 1478, respectively.

As with the additional protrusions 402, the top and bottom edges 1472 and 1474 of the additional protrusions 1402 are not exactly horizontal or parallel to a plane formed by the bottom edge 1422 of the tubular section 1416, but rather are slightly sloped, for reasons described further below. Notwithstanding the above description, however, in other embodiments the protrusions 1420 and additional protrusions 1402 can have other shapes (e.g., oval or elliptical, cylindrical, circular, or rectangular or substantially rectangular), and the additional protrusions can have top and bottom edges that are parallel to the plane of the bottom edge 1422. Also notwithstanding the above description, in some other embodiments it is possible to implement a lesser number of the additional protrusions (or baffle retaining features) 1402 for baffle retention purposes than the number of protrusions (or bumps) 1420 that are present for interlocking with upper mounting flange features such as the lugs 1460. For example, notwithstanding the presence of six of the protrusions 1420 in a sink flange, in one alternate embodiment only three of the additional protrusions for baffle retention purposes can be present. A smaller number of additional protrusions used for baffle retention can simplify the manufacture of the sink flange by reducing the number of features needing to be stamped into the sink flange.

Further, it should be additionally appreciated that the protrusions 1420, indentations 1440, lugs 1460, and additional protrusions 1402 respectively are intended to serve substantially the same functional purposes as the protrusions 420, indentations 440, lugs 460, and additional protrusions 402, respectively. That is, the protrusions 1420, indentations 1440, and lugs 1460 permit the securing of the upper mounting flange 1410 relative to the sink flange 1414 by way of the same process as described above, namely, (1) positioning the upper mounting flange 1410 so that the bottom edge 1422 of the tubular section 1416 is aligned with and enters the orifice 1450, (2) moving the upper mounting flange 1410 axially along the axis 1418 toward the rim 1412 of the sink flange 1414 so that the protrusions 1420 proceed into the indentations 1440, and (3) then rotating the upper mounting flange 1410 relative to the sink flange 1414 about the axis 1418 so that the protrusions 1420 pass through the channels and into alignment with the lugs 1460 such that the lugs 1460 are positioned between those protrusions and the rim 1412. Likewise, disassembly of the upper mounting flange 1410 from the sink flange 1412 entails the inverse of this process. Further, although not shown in FIG. 15 as in FIG. 8, it should be appreciated that the portions 1400 can also include a baffle corresponding to the baffle 406 of FIG. 8, and that such a baffle can be supported within the sink flange 1412 by way of the additional protrusions 1402.

Notwithstanding the aforementioned similarities, the portions 1400 differ from the portions 400 in that, rather than having six of the protrusions 420, six of the indentations 440, and six of the lugs 460, the portions 1400 instead have three of the protrusions 1420, three of the indentations 1440, and three of the lugs 1460. Further, it should be recognized by a comparison of FIG. 14 with FIG. 4 that the protrusions 1420 are substantially larger than the protrusions 420, particularly insofar as the width dimension 1428 of each of the protrusions 1420 is larger than the width dimension 428 of each of the protrusions 420. Given that the protrusions 1420 are different in number and in their dimensions relative to the protrusions 420, it should be recognized that, if a back-up flange corresponding to the back-up flange 308 described above is employed in relation to the portions 1400, such a back-up flange can have as few as three radially outwardly-extending indentations corresponding to the indentations 2306, but such indentations would have larger angular extents than the indentations 2306 so as to accommodate the protrusions 1420. Also, instead of the portions 1400 having six of the additional protrusions 402, there are three of the additional protrusions 1402 that are present. Thus, although it is intended that the additional protrusions 1402 serve to support a baffle in substantially the same manner as the baffle 406 is supported upon the additional protrusions 402 as shown in FIG. 8, such a baffle in the case of the embodiment of FIG. 14 and FIG. 15 would have sloped support features that would be appropriately configured to rest upon the three of the additional protrusions 1402 rather than the six of the additional protrusions 402.

Figure 16:
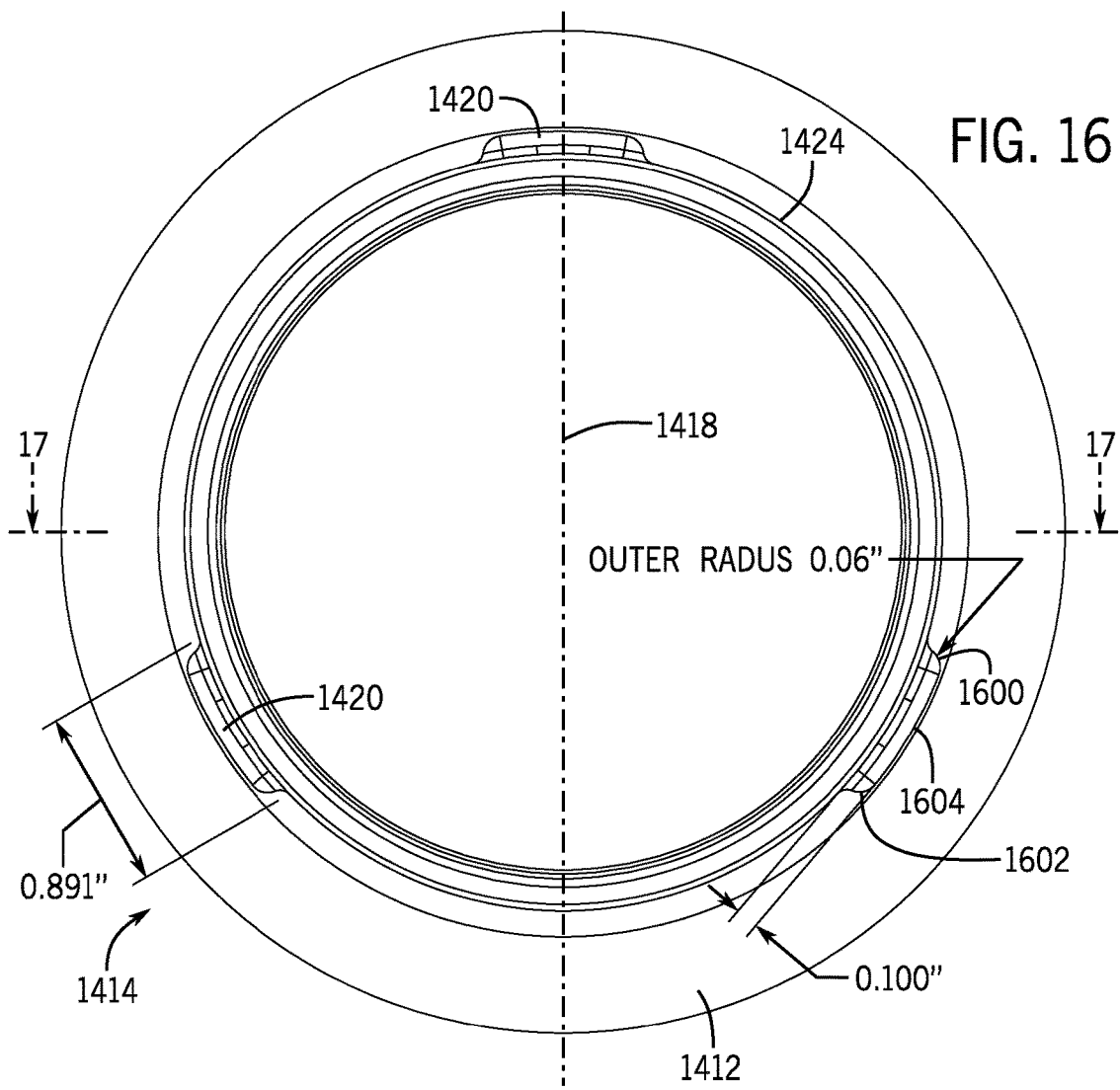
FIG. 16 is a bottom plan view of a sink flange component of the improved mounting assembly of FIG. 14 and FIG. 15.
Figure 17:
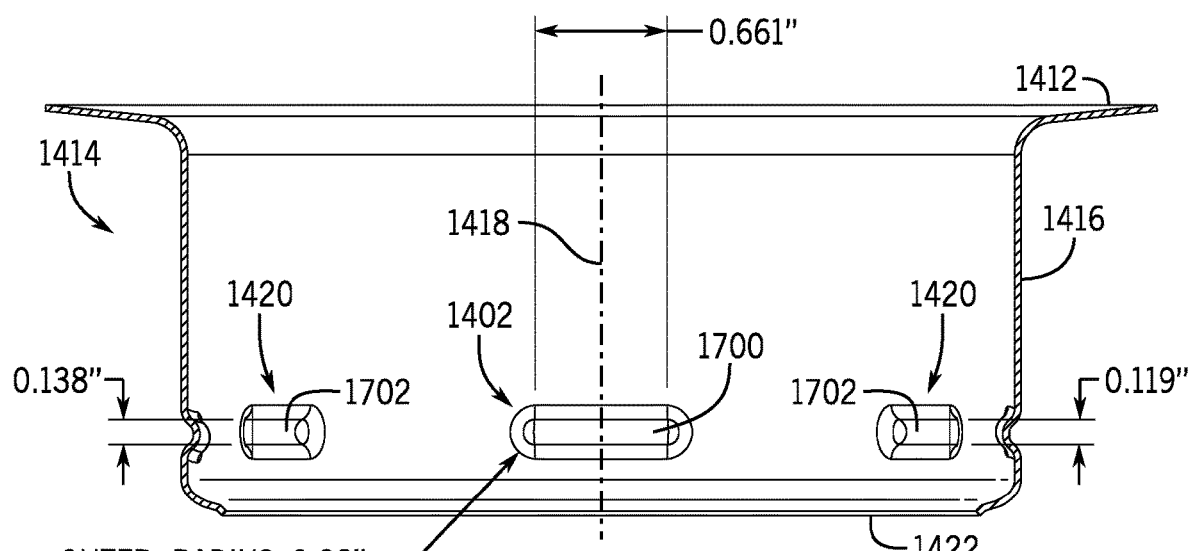
FIG. 17 is a cross-sectional view of the sink flange component of FIG. 16, taken along a line 17-17 of FIG. 16.

To provide further example details of the sink flange 1414 and particularly the protrusions 1420 and additional protrusions 1402 thereof, FIG. 16 and FIG. 17 are provided, which respectively show a bottom plan view of the sink flange 1414 and a cross-sectional view of the sink flange taken along a line 17-17 of FIG. 16. FIG. 16 particularly shows that, in the present example embodiment, each of the protrusions 1420 extends outward from the outer cylindrical surface 1424 by a distance of 0.1 inches. It can be seen that each of the protrusions 1420 extends outward by first and second radiused edges 1600 and 1602, which are then linked by a curved (approximately straight) circumferential perimeter segment or edge 1604. In the present embodiment, each of the radiused edges 1600, 1602 has an outer radius of 0.06 inches and the overall width of each of the protrusions 1420 corresponding to the width dimension 1428 of each of those protrusions as shown in FIG. 16 in the present example is 0.891 inches. The radiused edges 1600 and 1602 generally correspond to the curved edges 1436 and 1438, and the edge 1604 generally corresponds in extent with the top and bottom edges 1432 and 1434.

As for FIG. 17, in that cross-sectional view additional example dimensions are shown for the additional protrusions 1402. In particular, FIG. 17 shows that each of the additional protrusions 1402 has an outer radius of 0.08 inches, and also each of the top and bottom edges 1472 and 1474 has a length of approximately 0.661 inches. An inner flat portion 1700 of each of the additional protrusions 1402, which is the innermost portion of the respective additional protrusion, has a height of approximately 0.119 inches, a difference between that dimension and the overall height dimension 1470 being provided by the radiused aspect. Also, an inner flat portion 1702 of each of the protrusions 1420 in this embodiment has a dimension of 0.138 inches. Although not shown in the same manner as in FIG. 10, the depth of the additional protrusions 1402 again is, in this embodiment, 0.073 inches. Additionally, although the aforementioned dimensions described with reference to FIG. 16 and FIG. 17 are provided as examples, it should be understood that the present disclosure is not at all limited to embodiments having any of these dimensions, but rather the present disclosure is intended to encompass numerous other embodiments having features with any of a variety of other dimensions.

In view of the above description, it should be appreciated that the embodiment of the mounting assembly employing the portions 1400 of FIGS. 14, 15, 16, and 17 differs from the embodiment employing the portions 400 of FIG. 6 through FIG. 13 in several respects. In particular, the embodiment with the portions 1400 has three protrusions (or bumps) 1420 allowing for assembly of the upper mounting flange 1410 to the sink flange 1414, as well as three additional protrusions (or baffle retaining features) 1402 allowing for a baffle (not shown) to be mounted within the sink flange. By comparison with the embodiment employing the portions 400 described above, the embodiment employing the portions 1400 permits a simplified stamping process to be utilized for manufacturing the sink flange 1414 and the upper mounting flange 1410.

Also, it should be additionally recognized that, because the protrusions 1420 are twice as wide as the protrusions 420 (e.g., in terms of the width dimension 1428 versus the width dimension 428), the protrusions 1420 are capable of bearing the loading upon the sink flange 1414 from the upper mounting flange 1410 notwithstanding there only being three of the protrusions 1420 instead of six of the protrusions 420. At the same time, because the embodiment having the protrusions 420 has six of those protrusions (each of which is half as wide as the protrusions 1420), the load from the mounting flange is distributed at more locations than the embodiment employing three of the protrusions 1420.

Figure 18:
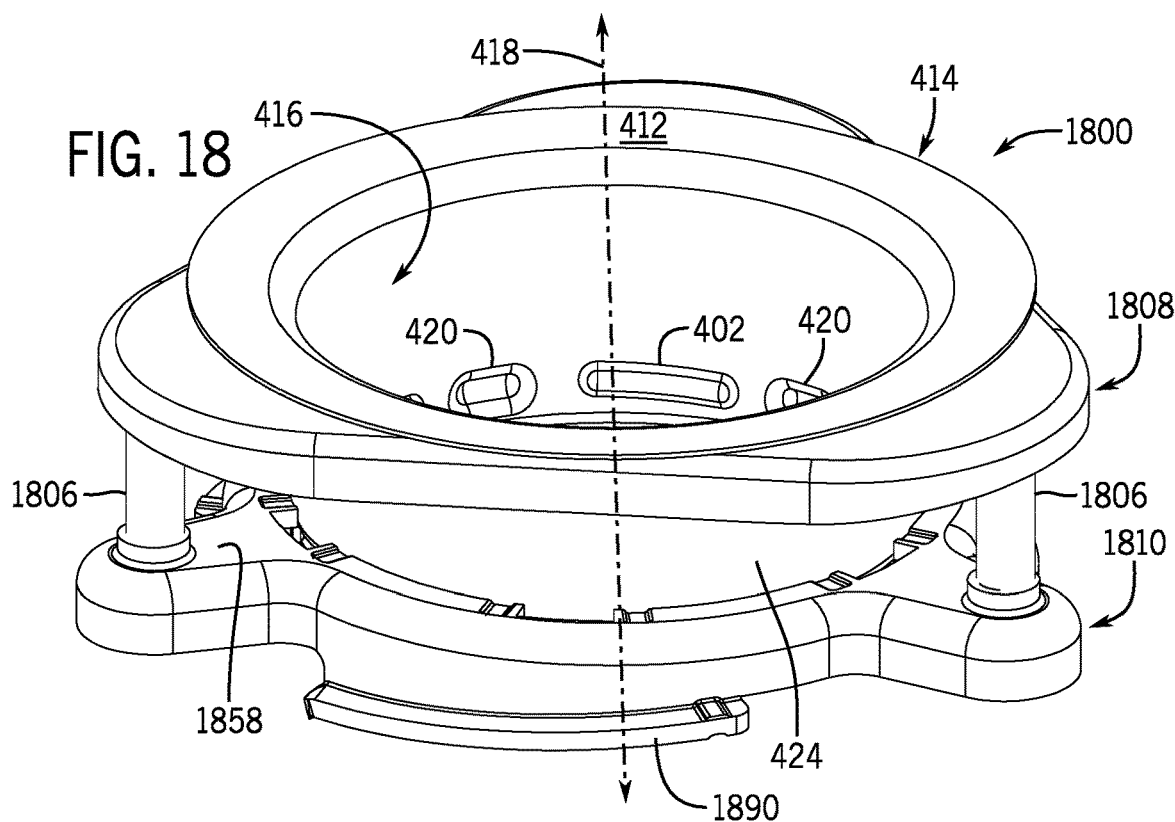
FIG. 18 is a front perspective view of portions of a fourth embodiment of an improved mounting assembly represented by FIG. 2.

Referring next to FIG. 18, portions 1800 of a fourth example mounting assembly that can be encompassed by the mounting assembly 208 of FIG. 2 are shown by way of a front perspective view. The portions 1800 include several components that are identical or substantially (or largely) similar in many respects to those of one or more of the other embodiments of mounting assemblies described above and, more particularly, to the portions 400 of the second example mounting assembly described above in regard to FIG. 6. In particular, the portions 1800 include the sink flange 414 having the rim 412, the tubular section (or extension or portion) 416 extending about the axis 418 between the rim 412 and bottom edge 422 (see FIG. 22), and the six protrusions 420 and six additional protrusions 402 (twelve protrusions in all). Again, as discussed above, the six protrusions 420 are spaced equidistantly around the outer cylindrical surface 424 of the tubular section, and each of the additional protrusions 402 is respectively positioned midway in between a respective pair of neighboring ones of the protrusions 420 (and vice-versa) arranged along the tubular section 416.

In addition to the sink flange 414, the portions 1800 of FIG. 18 also include a back-up flange 1808 corresponding to the back-up flange 308 (which, as discussed above, is often present during installation with respect to the portions 400 of FIG. 6 even though not shown in FIG. 6). Further, in the present embodiment, the portions 1800 include an upper mounting flange 1810, which corresponds, in terms of its position and role, to the upper mounting flange 410 shown in FIG. 6. In the arrangement of FIG. 18, the upper mounting flange 1810 is shown to be coupled to the back-up flange 1808 by back-up screws 1806 (two of which are shown, and which correspond in their role to the bolts 112 described above with respect to FIG. 1). As with the upper mounting flange 410, the upper mounting flange 1810 includes an orifice 1850 that can receive the tubular section 416 of the sink flange 414. Also, the upper mounting flange 1810 includes ramps (or inclined mounting fasteners or edges or ridges) 1890 extending from sides of the upper mounting flange 1810. Again in this case, the ramps 1890 are structures by which a food waste disposer such as the food waste disposer 206 can be directly or indirectly coupled to the upper mounting flange (e.g., by way of a lower mounting flange as discussed above) and the overall mounting assembly, and thus attached to a sink (or possibly another structure).

Figure 19:
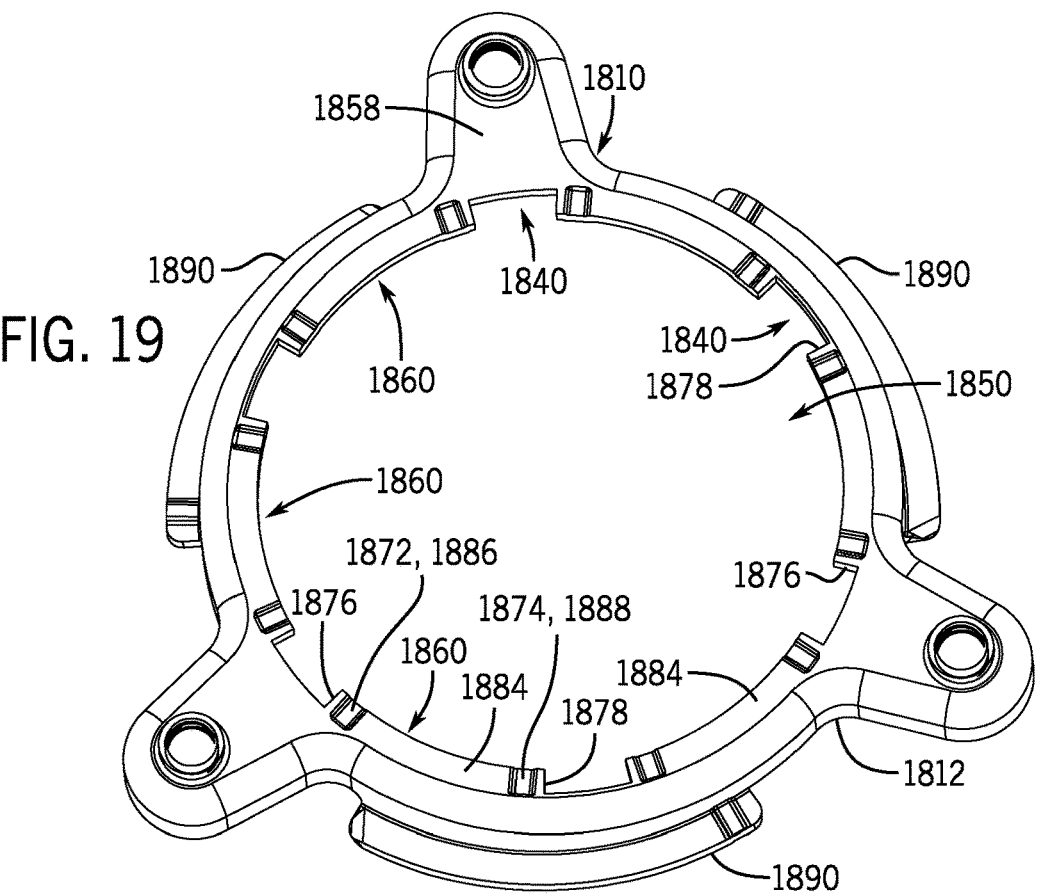
FIG. 19 is a top perspective view of an upper mounting flange component of the improved mounting assembly of FIG. 18.

Although similar in some respects to the upper mounting flange 410, the upper mounting flange 1810 has several features that differ from those of the upper mounting flange 410. In particular, the upper mounting flange 1810 includes six lugs 1860 and six indentations 1840 that respectively differ, in terms of their structures, relative to the lugs 460 and indentations 440, respectively, of the upper mounting flange 410. As is evident from FIG. 19 and FIG. 20, which respectively show top and bottom perspective views of the upper mounting flange 1810, each of the lugs 1860 takes the form of a flat ledge or flat land having a respective upper surface 1884 and a respective lower surface 1896. Each of the lugs 1860 extends radially inwardly from a main circumferential body 1812 of the upper mounting flange 1810 into the orifice 1850 (e.g., toward the position of the central axis 418 when the sink flange 414 and upper mounting flange 1810 are assembled with one another as shown in FIG. 18). Although each of the lugs 1860 extends radially inwardly, the lugs 1860 do not extend upward above an upper surface 1858 of the upper mounting flange 1810, as was the case with the lugs 460 of the upper mounting flange 410.

Further, each of the lugs 1860 has respective first and second ends 1876 and 1878, and extends circumferentially around the orifice 1850 between those respective first and second ends. As for the indentations 1840, these are respectively positioned between respective pairs of neighboring ones of the lugs 1860 (e.g., between the first end 1876 of a first respective neighboring one of the lugs and the second end 1878 of a second respective neighboring one of the lugs) and spaced around the orifice 1850. Indeed, the indentations 1840 can be considered as forming radially-outermost portions of the orifice 1850 that extend between the respective pairs of the lugs 1860, radially outwardly to the main circumferential body 1812.

Additionally, each of the lugs 1860 includes a respective pair of first and second dimple features 1872 and 1874 that are respectively positioned at or proximate to the first and second ends 1876 and 1878, respectively, of the respective lug. One example pair of the first and second dimple features 1872 and 1874 of one of the lugs 1860 is particularly illustrated in a detail view 1880 of a portion of the upper mounting flange 1810 shown in FIG. 21 (with that detail view corresponding to a region 1882 shown in FIG. 20), again with the upper mounting flange 1810 being oriented in accordance with the bottom perspective view shown in FIG. 20. It should be appreciated from FIG. 19, FIG. 20, and FIG. 21 that, due to the presence of the first and second dimple features 1872 and 1874, the lugs 1860 are not entirely flat along their lengths. Rather, along the respective upper surfaces 1884 of the respective lugs 1860, first and second depressions 1886 and 1888 respectively are present at or proximate to the respective first and second ends 1876 and 1878 of each respective lug, at the locations of the first and second dimple features 1872 and 1874, respectively, of each respective lug. Also, along the respective lower surfaces 1896 of the respective lugs 1860, first and second raised features 1892 and 1894 respectively are present at or proximate to the respective first and second ends 1876 and 1878 of each respective lug, at the locations of the first and second dimple features 1872 and 1874, respectively, of each respective lug. (Although the terms "depressions" and "raised features" are used with respect to the features 1886, 1888 1892, and 1894, it should be appreciated that the use of these terms is not intended to imply directional orientations of these structures relative to the ground, but rather are intended to imply directional orientations of these structures relative to other features of the lugs 1860, such as the lower surfaces 1896 or upper surfaces 1884.)

Referring additionally to FIG. 22, a bottom perspective view is provided showing a combination of the upper mounting flange 1810 and sink flange 414 when those two components are assembled with one another. In view of the description above concerning the protrusions 420 on the sink flange 414 and the lugs 1860 on the upper mounting flange 1810, it should be appreciated that the upper mounting flange 1810 can be secured relative to the sink flange 414 in a manner that is highly similar to that described with respect to the embodiment of FIG. 6, FIG. 7, and FIG. 8 (as well as other embodiments described above, such as that of FIG. 3, FIG. 4, and FIG. 5). In particular, the protrusions 420, indentations 1840, and lugs 1860 permit the securing of the upper mounting flange 1810 relative to the sink flange 414 by way of the same process as described above, namely, (1) positioning the upper mounting flange 1810 so that the bottom edge 422 of the tubular section 416 is aligned with and enters the orifice 1850, (2) moving the upper mounting flange 1810 axially along the axis 418 toward the rim 412 of the sink flange 414 so that the protrusions 420 proceed into (and through) the indentations 1840, and (3) then rotating the upper mounting flange 1810 relative to the sink flange 414 about the axis 418 so that the protrusions 420 pass under and into alignment with the lugs 1860, such that the lugs 1860 (including portions of radially-inwardmost edges or tips 1898 thereof, as shown in FIG. 20) are positioned between those protrusions and the rim 412. Likewise, disassembly of the upper mounting flange 1810 from the sink flange 414 entails the reverse of this process.

Although this process of assembly (and disassembly) concerning the upper mounting flange 1810 relative to the sink flange 414 is highly similar to the processes described with respect to other embodiments discussed above, there are certain differences. First, it should be appreciated that the upper mounting flange 1810 of FIGS. 18-22 lacks any structures corresponding to the ridge portions 356 that are positioned to the sides of the lugs 360 and that overhang a region or define any channel as discussed in regard to FIGS. 3 and 4 above. Rather, it is only the lugs 1860 that extend radially inwardly from the main circumferential body 1812 of the upper mounting flange 1810. Correspondingly, rotation of the upper mounting flange 1810 relative to the sink flange 414 about the axis 418 during assembly merely involves moving the respective protrusions 420 from respective positions within the respective indentations 1840 to respective positions that are in alignment with and under the respective lugs 1860, between the respective first and second raised features 1892 and 1894 associated with the respective first and second dimple features 1872 and 1874 of the respective lugs 1860.

Additionally, it should be appreciated that the first and second dimple features 1872 and 1874 of the lugs 1860 play a significant role in maintaining the upper mounting flange 1810 in an assembled state relative to the sink flange 414. That is, by providing the lugs 1860 with the first and second dimple features 1872 and 1874, and particularly the first and second raised features 1892 and 1894 respectively associated with those respective dimple features, the respective protrusions 420 tend to be retained in their respective positions between the respective first and second dimple features 1872 and 1874 of the respective lugs 1860 after the upper mounting flange 1810 has been rotated relative to the sink flange 414 sufficiently so that the respective protrusions 420 attain such positions. In other words, by employing the upper mounting flange 1810 with the flat ledges or lands with the raised features 1892, 1894 (or raised edges) as the lugs 1860, it becomes less likely for the sink flange (or strainer flange) 414 to rotate to a point where the protrusions (or "bumps") 420 on the sink flange move past the ends 1876 and 1878 of the lugs (or "fall off" the edges of the flat ledges, to the extent the lower surfaces 1896 of the lugs 1860 are viewed as support surfaces for the protrusions, e.g., as illustrated in FIG. 2). Effectively, the respective first and second raised features 1892 and 1894 associated with the respective lugs 1860 tend to serve as stops for the protrusions 420, and tend to prevent inadvertent excessive rotation of the upper mounting flange 1810 relative to the sink flange 414 after the upper mounting flange and sink flange have been assembled together. Thus, this arrangement tends to prevent accidental disengagement of the upper mounting flange 1810 from the sink flange 414.

It should further be appreciated that, in the present embodiment, the distances between the first and second dimple features 1872 and 1874 of any given one of the lugs 1860 are considerably greater than the width dimension 428 of the protrusion 420 (as discussed in relation to FIG. 6). Consequently, although the first and second dimple features 1872 and 1874 of the lugs 1860 tend to retain the protrusions 420 when the protrusions are positioned between the first and second raised features 1892 and 1894 associated with those respective dimple features, the lugs do not tend to strictly limit or lock in place those protrusions 420 in particular positions beneath the lugs. Rather, there is some angular/rotational freedom of movement of the respective protrusions 420 when positioned beneath the respective lugs 1860, between the respective first and second raised features 1892 and 1894 of the respective lugs (by comparison, in at least some embodiments or circumstances, the lugs 460 of FIG. 6 can be considered locking lugs that create defined spaces where protrusions on the sink flange are intended to end up when the upper mounting flange is assembled to the sink flange).

Notwithstanding the above description concerning the portions 1800 of the mounting assembly (and particularly the upper mounting flange 1810) with respect to FIGS. 18 through 22, it should be appreciated that the present disclosure is intended to encompass numerous other embodiments of mounting assemblies or portions of mounting assemblies that include one or more features that are in addition to, or differ from, those described in relation to the portions 1800. For example, in another example embodiment, a mounting assembly can include the portions 1800 except insofar as the additional protrusions 402 are not present (e.g., similar to as shown in FIG. 3). Also for example, the number of lugs 1860 can be reduced or increased, from six, for example, if the number of protrusions 420 also correspondingly is reduced or increased. Also, although the portions 1800 are configured such that the first and second dimple features 1872 and 1874 are respectively positioned at or in close proximity to the first and second ends 1876 and 1878 respectively, in other embodiments the lugs 1860 can include end extensions that extend angularly outward farther from the dimple features, such that the dimple features are more inwardly-positioned along the lugs, away from the ends of the lugs. In some such embodiments, such end extensions can be considered to correspond to the ridge portions 356 discussed above. Additionally, in some alternate embodiments, the lugs 1860 can be flat along their lengths and lack any of the first and second dimple features 1872 and 1874, the first and second depressions 1886 and 1888, and the first and second raised features 1892 and 1894, or the lugs can respectively have only one of the dimple features and associated depression and raised feature at one of the ends of the respective lug (but not the other end).

Embodiments of mounting assemblies encompassed herein such as those described above can provide any one or more of a variety of advantages. In view of the above discussion, it should be appreciated that one or more of the embodiments encompassed herein achieve a mounting assembly by which an upper mounting flange can be easily and straightforwardly attached to a sink flange, and therefore facilitates the attachment of a waste disposer such as a food waste disposer to a structure such as a sink. Such embodiments particularly eliminate or minimize the difficulties associated with snap ring removal and reinstallation. Securing of the upper mounting flange to the sink flange in at least some embodiments can be achieved without the use of a snap ring or retaining ring. As described above, the process of installation can simply involve positioning the upper mounting flange in relation to the sink flange, sliding the upper mounting flange relative to the sink flange past the protrusions (e.g., the protrusions 320, 420, or 1420) so the protrusions are within (or pass through) complementary indentations, and turning the upper mounting flange relative to the sink flange so that the protrusions are secured relative to the lugs (e.g., the lugs 360, 460, 1460, or 1860). The operation of the protrusions (e.g., the protrusions 320, 420, or 1420) of the sink flange relative to the features of the upper mounting flange effectively involves providing of a groove or support on which the upper mounting flange can sit or rest, and provides the installer with feedback that successful securing of the upper mounting flange with the sink flange has been achieved.

Also, by rotationally aligning and evenly distributing lugs such as the lugs 360, 460, 1460, or 1860 with ramps (or inclined mounting fasteners or edges or ridges) such as the ramps 390, 490, 1490, or 1890, and relatedly rotationally aligning and evenly distributing protrusions such as the protrusions 320, 420, 1420 with those lugs during the attachment of the upper mounting flange with the sink flange, one or more of the mounting assemblies encompassed herein are configured to provide desirable load distribution. Additionally, one or more of the embodiments encompassed herein provide a new manner of retaining a baffle (especially a removable baffle), by way of the use of additional protrusions such as the additional protrusions 402 or 1402 that are different from conventional snap ring retaining features. Further, as already discussed above, such additional protrusions in at least some embodiments are angled or sloped, rather than being within a horizontal plane or plane perpendicular to the axis along which the tubular section of the sink flange extends (such as any of the axes 318, 418, and 1418). This characteristic is distinctive in that it prevents some inappropriate baffles (e.g., outdated baffles or baffles intended for other waste disposer systems) from being implemented within the sink flange. Correspondingly, baffles that are intended for use with the sink flange 1412 having the additional protrusions 1402 would tend not to be usable in other sink flanges for which those baffles are not intended to be used.

Further for example, in addition to the aforementioned advantages, one or more of such embodiments encompassed herein allow for a mounting assembly (and overall food waste disposer assembly) to be implemented that is compatible with standard sink hole dimensions and does not change the depth of the sink with which the mounting assembly (and overall food waste disposer assembly) can be implemented. Among other things, the sink (or strainer) flange including the protrusions formed thereon (e.g., the protrusions 320, 420, or 1420) can be sized to fit within industry standard sink drain openings. Any complementary notches/depressions formed within the interior of the sink flange arising from the presence of those protrusions will be covered by a baffle implemented within the sink flange. Also, one or more of such embodiments encompassed herein remain backwards compatible with existing waste disposer designs and mounting gaskets. Further, one or more of such embodiments encompassed herein can be implemented using a thin sink flange (or strainer flange), which maximizes opening diameter and reduces how much the sink flange might protrude up into a sink. Thus, at least some of the embodiments described herein facilitate the ease of installing a waste disposer by eliminating or reducing the difficulty level associated with installation, particularly in terms of the attachment of an upper mounting flange to a sink flange, and at the same time remain backwards compatible and dimensionally identical or substantially similar to older mounting features/components.

Additionally it should be appreciated that, although the various embodiments described above can share in common one or more advantages, it is also possible that one or more of the above-described embodiments can have additional or different advantages by comparison with one or more others of the above-described embodiments. For example, the mounting assembly arrangement described above in relation to FIGS. 18 through 22 employing the upper mounting flange 1810 with the lugs 1860 can be advantageous by comparison with some of the other embodiments described above that employ the raised lugs (e.g., the lugs 460). More particularly, the use of the lugs 1860 with the flat ledges or lands makes it possible to assemble the upper mounting flange 1810 with respect to the sink flange 414 without locating pockets for the protrusions 420, since the flat ledges or lands (or ramps) can offer more surface area to provide support (e.g., along the lower surfaces 1896 of the respective lugs 1860, between the respective first and second raised features 1892 and 1894 of the respective lugs). Also, the upper mounting flange 1810 having (and because of its having) the lugs 1860 with flat ledges can be manufactured by way of a simpler process, such as by way of a stamping process, by comparison with some other embodiments.

It is specifically intended that the present invention not be limited to the embodiments and illustrations contained herein, but include modified forms of those embodiments including portions of the embodiments and combinations of elements of different embodiments as come within the scope of the following claims.

We claim:

1. A mounting system for mounting a waste disposer, the mounting system comprising:
    a first flange component having first and second ends and a tubular structure having an outer cylindrical surface, the tubular structure extending along a first axis between the first and second ends;
    a mounting flange component having an inner edge defining at least in part an orifice extending through the mounting flange component and sized so that a first portion of the tubular structure including the second end can pass partly into or entirely through the orifice,
    wherein when the first portion of the tubular structure is received in the orifice, both the orifice and the tubular structure extend along the first axis,
    wherein the tubular structure includes a plurality of first protrusions extending radially outward from the outer cylindrical surface, the plurality of first protrusions including a first one of the first protrusions and one or more additional ones of the first protrusions,
    wherein the mounting flange component includes a plurality of lugs having respective tips proximate to or along the inner edge, the plurality of lugs including a first one of the lugs and one or more additional ones of the lugs,
    wherein the respective lugs are arranged around the orifice and the respective first protrusions are arranged around the outer cylindrical surface so that, if the first portion of the tubular structure is positioned into the orifice such that the first one of the lugs is rotationally aligned with the first one of the first protrusions about the first axis, then each of the one or more additional ones of the lugs is also rotationally aligned with a respective one of the one or more additional ones of the first protrusions about the first axis,
    wherein when the respective lugs are aligned with the respective first protrusions and when the tubular structure is positioned sufficiently far into the orifice along the first axis so that the respective tips of the respective lugs are positioned between the respective first protrusions and the first end of the first flange component, then the mounting flange component is secured in relation to the first flange component, and
    wherein the tubular structure includes a plurality of second protrusions extending radially inward from an inner cylindrical surface of the tubular structure toward the first axis; and
    a baffle that can be positioned within an inner passageway formed within the tubular structure, wherein the baffle can be mounted in relation to the tubular structure by way of contact between the baffle and the second protrusions.

2. The mounting system of claim 1, wherein the lugs are substantially flat ledge structures that extend radially inwardly from a main circumferential body of the mounting flange component, wherein each of the lugs includes respective first and second ends, and wherein each of the lugs includes respective first and second raised features respectively positioned at or proximate to the first and second ends, respectively.

3. The mounting system of claim 1, wherein the first flange component includes a rim at or proximate to the first end, and wherein the first protrusions are all arranged along or proximate to the first end, and wherein the first protrusions are all arranged along or proximate to a first plane that is perpendicular to a first location along the first axis.

4. The mounting system of claim 3, wherein the tips of the lugs are all arranged within or proximate to a second plane that is aligned or substantially aligned with the first plane when the tubular structure is positioned sufficiently far into the orifice along the first axis so that the respective tips of the respective lugs are positioned between the first protrusions and the first end of the first flange component, and wherein the plurality of lugs includes at least six of the lugs, and the plurality of first protrusions includes at least six of the first protrusions.

5. The mounting system of claim 1, wherein the respective first protrusions have respective first contact surfaces and the respective tips of the respective lugs have respective second contact services, and wherein the respective first contact surfaces are in contact with the respective second contact surfaces when the mounting flange component is secured in relation to the first flange component.

6. The mounting system of claim 5, wherein the first protrusions are capsule-shaped protrusions each having a respective first arc width dimension as measured perpendicularly or substantially perpendicularly to the first axis and a first height dimension measured parallel to or substantially parallel to the first axis, and wherein the first arc width dimension is substantially greater than the first height dimension.

7. The mounting system of claim 6, wherein the first protrusions have first and second arc edges that are substantially perpendicular to the first axis and first and second curved edges that link the first and second arc edges.

8. The mounting system of claim 5, wherein each of the first protrusions has a shape that is selected from the group consisting of an oval or elliptical shape, a cylindrical shape, a circular shape, and a rectangular or substantially rectangular shape.

9. The mounting system of claim 1, wherein the mounting flange component additionally includes a plurality of indentation formations positioned along the inner edge, wherein the plurality of indentation formations includes a first one of the indentation formations and one or more additional ones of the indentation formations, wherein each of the respective indentation formations is positioned substantially between a respective pair of the lugs along the inner edge, and wherein each of the respective lugs is positioned substantially between a respective pair of the indentation formations along the inner edge.

10. The mounting system of claim 9, wherein the respective indentation formations are arranged around the orifice and the respective first protrusions are arranged around the outer cylindrical surface so that, if the first portion of the tubular structure is positioned partly into or entirely through the orifice such that the first one of the first protrusions is rotationally aligned with the first one of the indentation formations, then each of the one or more additional ones of the first protrusions is also rotationally aligned with a respective one of the one or more additional ones of the indentation formations.

11. The mounting system of claim 10, wherein each of the indentation formations is sized, in terms of a respective arc width dimension and a radial depth dimension, so as to be capable of receiving therewithin a respective one of the first protrusions when the first portion of the tubular structure passes partly into or entirely through the orifice.

12. The mounting system of claim 10, wherein the mounting flange component includes a plurality of circumferentially-extending passages, wherein each of the circumferentially-extending passages links a respective one of the indentation formations with a respective one of the lugs.

13. The mounting system of claim 12, wherein an assembling and securing of the mounting flange component with respect to the first flange components is achieved by a rotation of the mounting flange component relative to the first flange component about the first axis, from a first rotational position in which the respective first protrusions are positioned within the respective indentation formations, to a second rotational position in which the respective first protrusions are rotationally aligned with and in contact with the respective lugs, and wherein during the rotation the respective first protrusions pass through the respective circumferentially-extending passages between the respective indentation formations and the respective lugs.

14. The mounting system of claim 1, wherein each of the second protrusions has a respective first edge that is sloped relative to a first plane perpendicular to the first axis, and wherein the baffle includes a plurality of complementary formations along a rim portion of the baffle, wherein the respective complementary formations are configured to engage the respective first edges of the respective second protrusions so that the rim portion is within or parallel to the first plane.

15. A waste disposer system comprising the mounting system of claim 1, wherein the waste disposer system is a food waste disposer system and includes the waste disposer, which is a food waste disposer, wherein the first flange component is a sink flange component, and wherein the food waste disposer is coupled to the first flange component at least indirectly by way of the mounting flange component.

16. A method of assembling a mounting system for use in coupling a food waste disposer to a sink, the method comprising:
  positioning a mounting flange component in relation to a sink flange component so that an orifice extending through, and defined at least in part by an inner edge of, the mounting flange component is proximate to a first end of an outer cylindrical surface of a tubular structure of the sink flange component;
  moving the mounting flange component relative to the tubular structure along a first axis along which the tubular structure extends, so that a first portion of the tubular structure including the first end can pass partly into or entirely through the orifice and the mounting flange component moves toward a second end of the outer cylindrical surface;
  rotating the mounting flange component relative to the tubular structure about the first axis so that a plurality of lugs extending from, and having respective tips proximate to or along the inner edge of, the mounting flange component respectively become rotationally aligned with a plurality of first protrusions extending radially outward from the outer cylindrical surface,
  wherein, as a consequence of the rotating of the mounting flange component relative to the tubular structure, the respective tips of the respective lugs are positioned between the first protrusions and the second end of the sink flange component, such that the mounting flange component is secured in relation to the sink flange component;
  positioning a baffle within an inner passageway formed within the tubular structure, wherein the tubular structure includes a plurality of second protrusions extending radially inward into the inner passageway from an inner cylindrical surface of the tubular structure toward the first axis; and
  mounting the baffle in relation to the tubular structure by way of contact between the baffle and the second protrusions.

17. The method of claim 16,
  wherein the moving of the mounting flange component relative to the tubular structure includes positioning the plurality of first protrusions within a plurality of indentation formations of the mounting flange component, and
  wherein the rotating of the mounting flange component relative to the tubular structure includes passing the first protrusions from respectively being positioned within the indentation formations, respectively, to being in contact with the lugs, respectively.

18. A food waste disposer system comprising:
  a food waste disposer;
  a mounting assembly configured to allow for securing of the waste disposer system to a sink; and
  at least one coupling component linking the waste disposer with the mounting assembly, wherein the mounting assembly includes:
    a sink flange component having first and second ends and a tubular structure having an outer cylindrical surface, the tubular structure extending along a first axis between the first and second ends and including a plurality of first protrusions extending radially outward from the outer cylindrical surface, wherein the tubular structure includes a plurality of second protrusions extending radially inward from an inner cylindrical surface of the tubular structure toward the first axis;
    a mounting flange component having an inner edge defining at least in part an orifice extending through the mounting flange component and sized so that a first portion of the tubular structure including the second end can pass partly into or entirely through the orifice, the mounting flange component including a plurality of lugs having respective tips proximate to or along the inner edge;
    means for allowing the first protrusions to pass in relation to the mounting flange component when the mounting flange component is rotated about the first axis relative to the tubular structure so that the first protrusions proceed from a first status in which the sink flange component with the first protrusions is axially movable relative to the mounting flange component along the first axis to a second status in which respective tips of the respective lugs are positioned between the first protrusions and the first end of the sink flange component along the first axis such that the sink flange component is no longer axially movable relative to the mounting flange component along the first axis; and a baffle that can be positioned within an inner passageway formed within the tubular structure, wherein the baffle can be mounted in relation to the tubular structure by way of contact between the baffle and the second protrusions.

\* \* \* \* \*